US012671110B2

(12) United States Patent
Koitabashi et al.

(10) Patent No.: US 12,671,110 B2
(45) Date of Patent: Jun. 30, 2026

(54) SECONDARY BATTERY, BATTERY PACK, AND VEHICLE

(71) Applicant: KABUSHIKI KAISHA TOSHIBA, Tokyo (JP)

(72) Inventors: Yuiko Koitabashi, Yokohama (JP); Kazuomi Yoshima, Yokohama (JP); Asato Kondo, Yokohama (JP); Sayaka Morimoto, Kawasaki (JP); Tetsuya Sasakawa, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 805 days.

(21) Appl. No.: 17/822,193

(22) Filed: Aug. 25, 2022

(65) Prior Publication Data

US 2023/0299345 A1      Sep. 21, 2023

(30) Foreign Application Priority Data

Mar. 17, 2022   (JP) ................................. 2022-042843
Aug. 23, 2022   (JP) ................................. 2022-132777

(51) Int. Cl.
*H01M 10/0567*          (2010.01)
*H01M 4/02*          (2006.01)
          (Continued)

(52) U.S. Cl.
CPC ....... *H01M 10/0567* (2013.01); *H01M 4/485* (2013.01); *H01M 4/62* (2013.01);
          (Continued)

(58) Field of Classification Search
CPC ........... H01M 10/0567; H01M 50/204; H01M 50/249; H01M 50/284; H01M 50/296; H01M 4/485; H01M 4/62; H01M 10/0525
See application file for complete search history.

(56) References Cited

U.S. PATENT DOCUMENTS

2014/0134477 A1    5/2014  Kuriyama et al.
2016/0276652 A1*   9/2016  Iwasaki ................. H01M 4/622
          (Continued)

FOREIGN PATENT DOCUMENTS

CN        113728485        11/2021
JP        2008-270086      11/2008
          (Continued)

OTHER PUBLICATIONS

Wu, Z. et al. "The Roles of Sulfur-Containing Additives and Their Working Mechanism on the Temperature-Dependent Performances of Li-Ion Batteries", Journal of The Electrochemical Society, 165 (11), 2018, pp. A2792-A2800 (10 pages).
          (Continued)

*Primary Examiner* — Armindo Carvalho, Jr.
(74) *Attorney, Agent, or Firm* — Oblon, McClelland, Maier & Neustadt, L.L.P.

(57)          ABSTRACT

In general, according to one embodiment, a secondary battery includes a positive electrode and a nonaqueous electrolyte. The positive electrode includes a sulfur-containing layer provided on at least a part of a positive electrode active material-containing layer. The nonaqueous electrolyte includes a sulfur-containing compound consisting of at least one of a sulfur-containing imide compound or a sultone compound, or consisting of at least one of a sulfur-containing imide compound, a sultone compound or a propane-sulfonic acid ester. The secondary battery satisfies $1\times10^{-6} \leq E/A \leq 9\times10^{-4}$. A denotes a mass of sulfur atoms per unit volume ($g/m^3$) of the sulfur-containing layer. E denotes a concentration (mol/L) of the sulfur-containing compound in the nonaqueous electrolyte.

7 Claims, 8 Drawing Sheets

(51) Int. Cl.

| | |
|---|---|
| *H01M 4/485* | (2010.01) |
| *H01M 4/62* | (2006.01) |
| *H01M 10/0525* | (2010.01) |
| *H01M 50/204* | (2021.01) |
| *H01M 50/249* | (2021.01) |
| *H01M 50/284* | (2021.01) |
| *H01M 50/296* | (2021.01) |

(52) U.S. Cl.

CPC ..... *H01M 10/0525* (2013.01); *H01M 50/204* (2021.01); *H01M 50/249* (2021.01); *H01M 50/284* (2021.01); *H01M 50/296* (2021.01); *H01M 2004/027* (2013.01); *H01M 2004/028* (2013.01); *H01M 2220/20* (2013.01); *H01M 2300/0025* (2013.01)

(56) References Cited

U.S. PATENT DOCUMENTS

| | | | |
|---|---|---|---|
| 2019/0027793 A1* | 1/2019 | Joo | H01M 4/625 |
| 2020/0044235 A1* | 2/2020 | Sasakawa | H01M 4/131 |
| 2021/0288306 A1 | 9/2021 | Fukaya et al. | |
| 2022/0216516 A1* | 7/2022 | Kim | H01M 10/0525 |
| 2022/0344714 A1* | 10/2022 | Shim | H01M 4/505 |

FOREIGN PATENT DOCUMENTS

| | | |
|---|---|---|
| JP | 2011-187235 | 9/2011 |
| JP | WO 2013/145109 A1 | 10/2013 |
| JP | 2015-69702 | 4/2015 |
| JP | 2015-122236 | 7/2015 |
| JP | 2019-106251 | 6/2019 |
| JP | 2021-144819 | 9/2021 |
| JP | 2021-144819 A | 9/2021 |
| JP | 2021-150215 A | 9/2021 |
| KR | 10-2022-0030908 | 3/2022 |
| WO | WO 2013/137418 A1 | 9/2013 |

OTHER PUBLICATIONS

Office Action mailed on Oct. 21, 2025, in corresponding Japanese Application No. 2022-132777 (with English translation).
Office Action mailed on Apr. 22, 2026, in corresponding Chinese Application No. 202211061748.3 (with English translation).

* cited by examiner

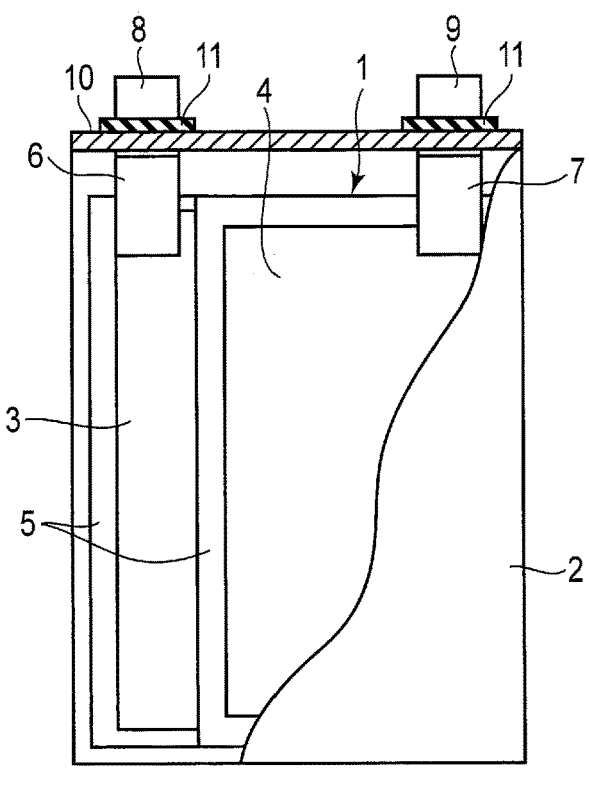
F I G. 3
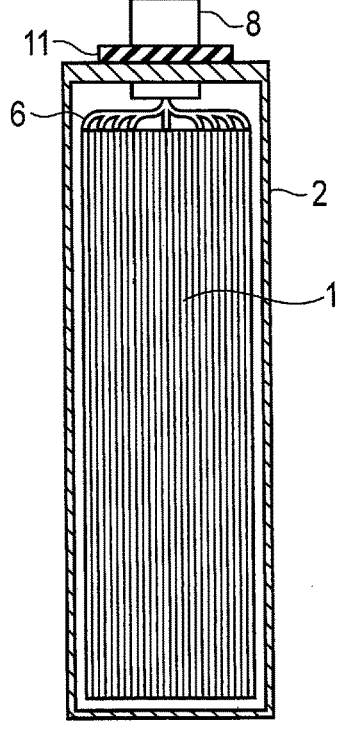
F I G. 4

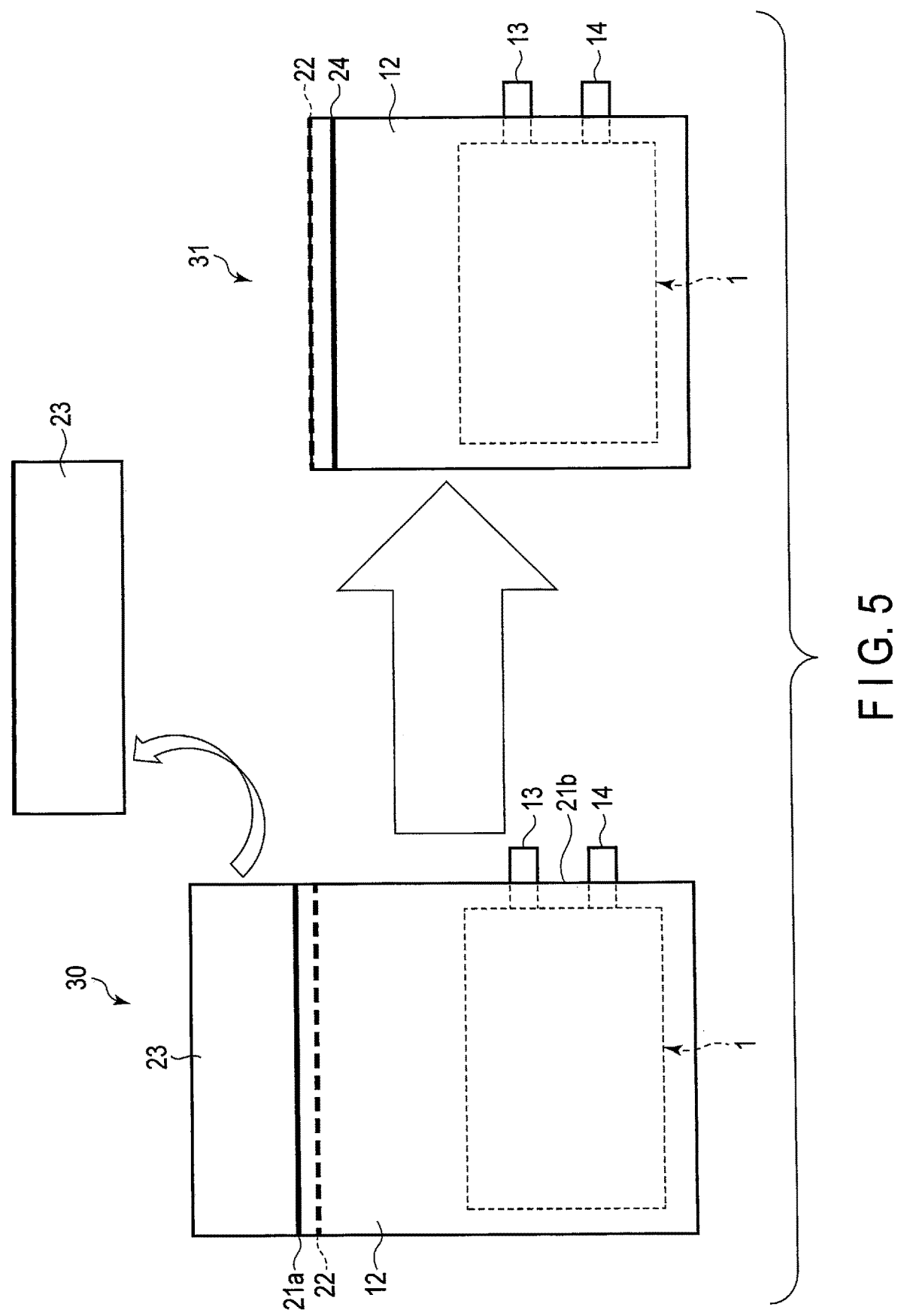
F I G. 5

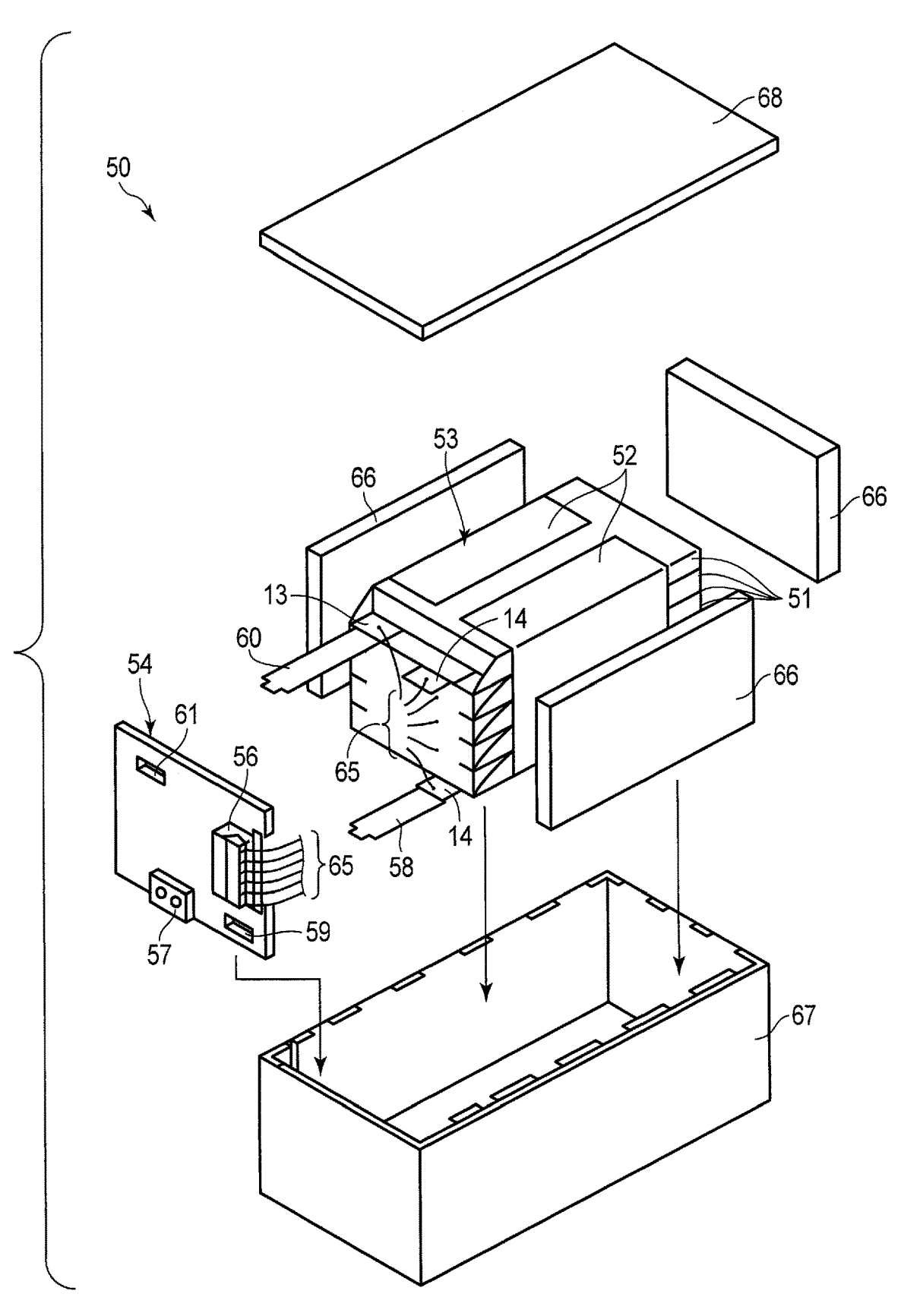
F I G. 6

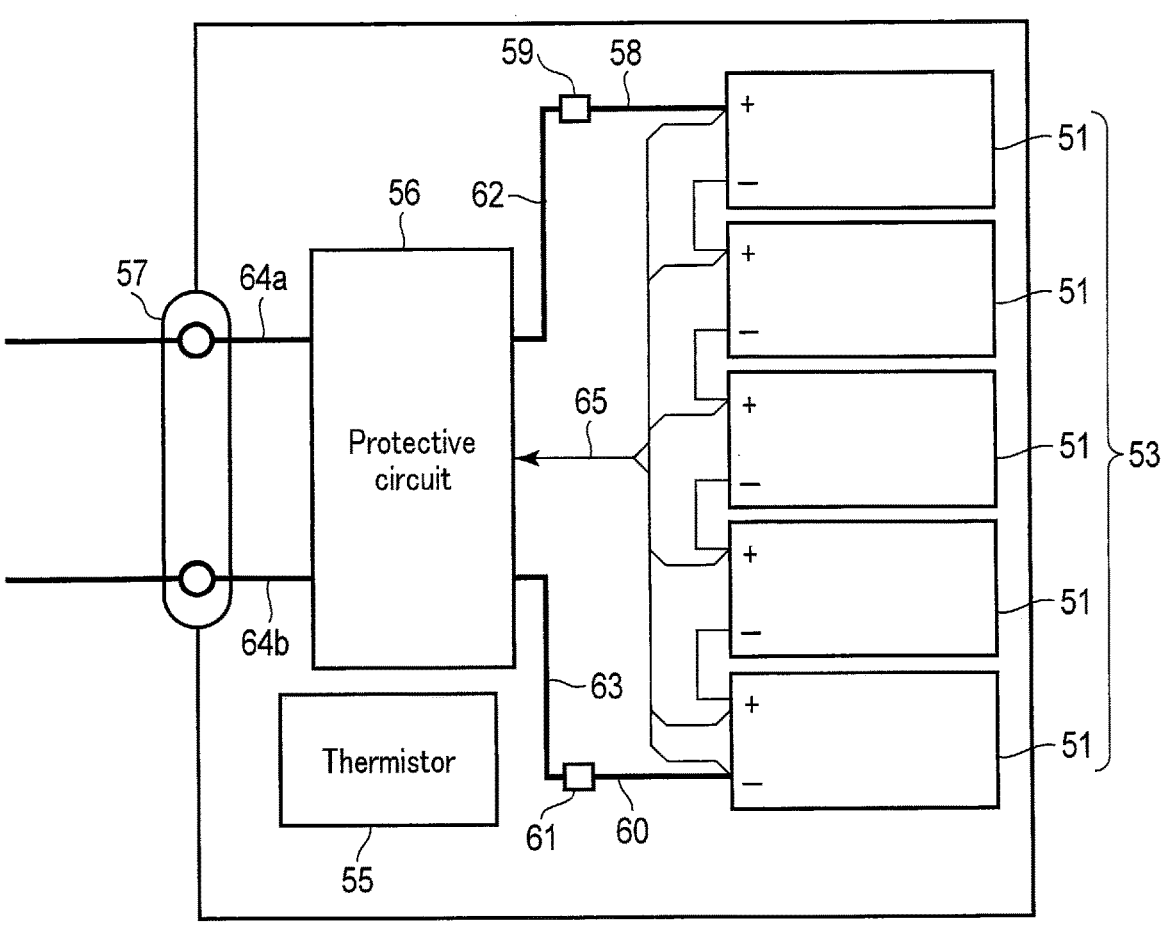
F I G. 7
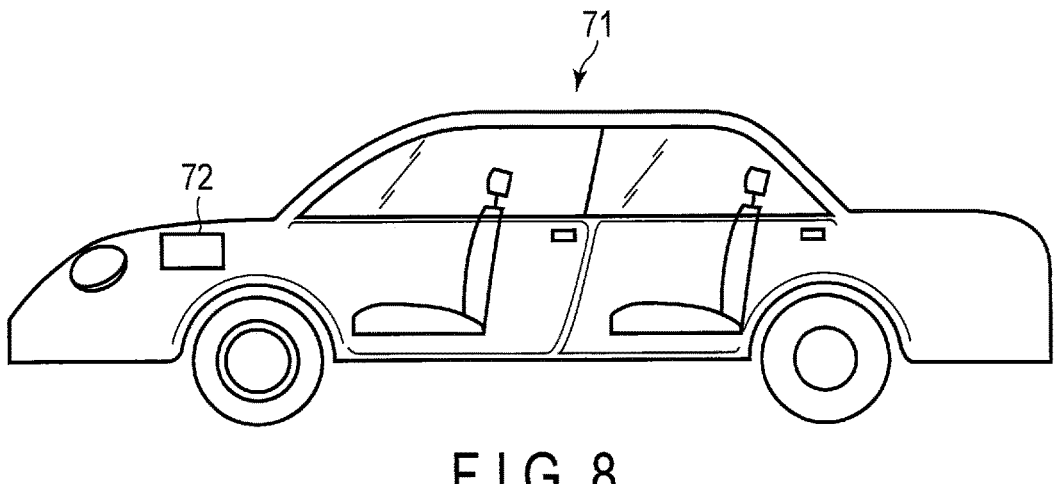
F I G. 8

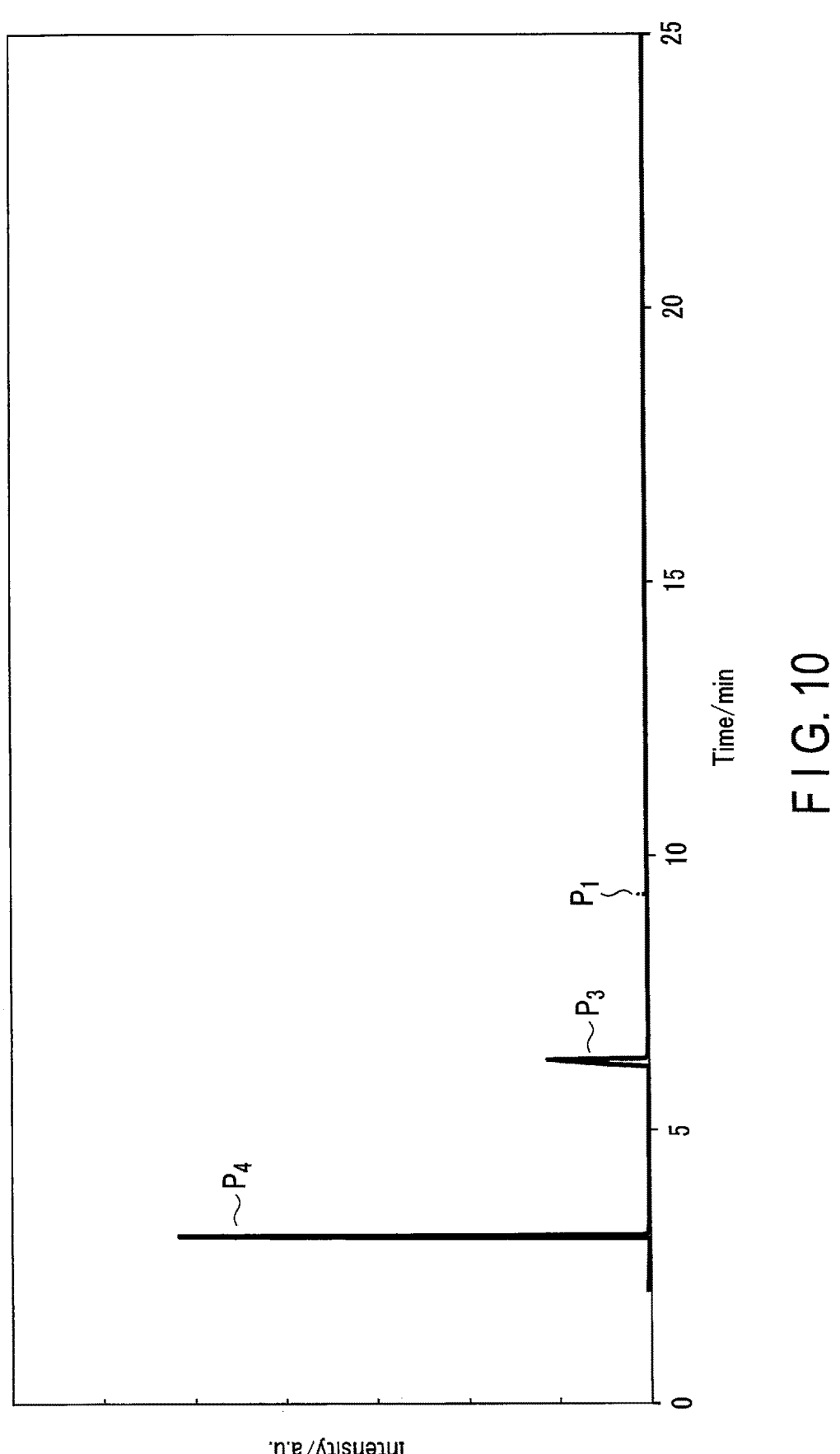
F I G. 10

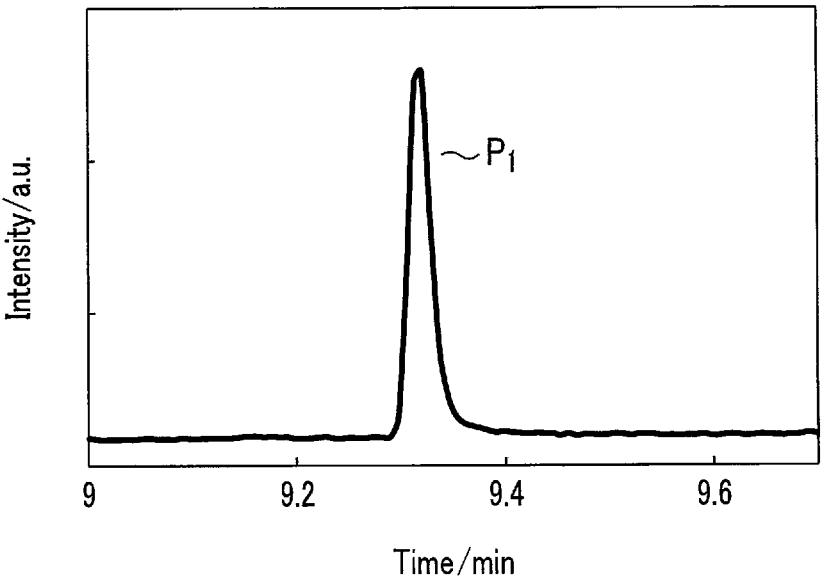
F I G. 11
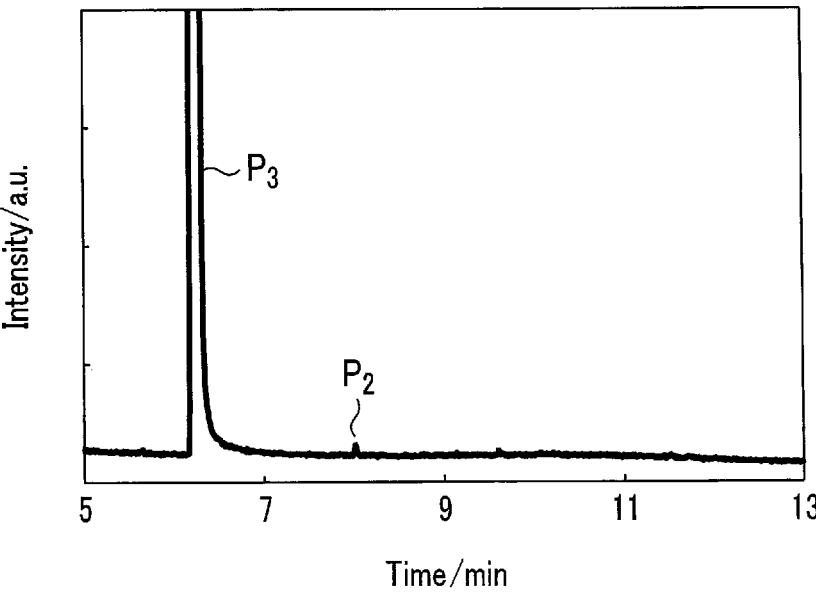
F I G. 12

SECONDARY BATTERY, BATTERY PACK, AND VEHICLE

CROSS-REFERENCE TO RELATED APPLICATION

This application is based upon and claims the benefit of priority from Japanese Patent Applications No. 2022-042843, filed Mar. 17, 2022, and No. 2022-132777, filed Aug. 23, 2022 the entire contents of all of which are incorporated herein by reference.

FIELD

Embodiments of the present invention relate to a secondary battery, a battery pack and a vehicle.

BACKGROUND

Use of an electrode that includes a niobium titanium oxide as a negative electrode active material in a secondary battery has been considered. Such a secondary battery has issues in its lifetime performance. Reasons for this include gas generation, increased resistance, and the like.

BRIEF DESCRIPTION OF THE DRAWINGS

FIG. 3 is a partially cut-out cross-sectional view of the secondary battery according to the embodiment.

FIG. 4 is a side view of the battery shown in FIG. 3.

FIG. 5 is a schematic plan view showing an example of a method of producing the secondary battery of the embodiment.

FIG. 6 is an exploded perspective view of a battery pack according to an embodiment.

FIG. 7 is a block diagram showing an electric circuit of the battery pack shown in FIG. 6.

FIG. 8 is a schematic view showing an example of a vehicle including the secondary battery of the embodiment.

FIG. 10 is a diagram showing a total ion chromatogram (TIC) of a nonaqueous electrolyte of Example 28.

FIG. 11 is an enlarged view of the vicinity of a peak $P_1$ in the TIC shown in FIG. 10.

FIG. 12 is an enlarged view of the vicinity of 7 to 9 time/min in the TIC shown in FIG. 10.

DETAILED DESCRIPTION

Figure 1:
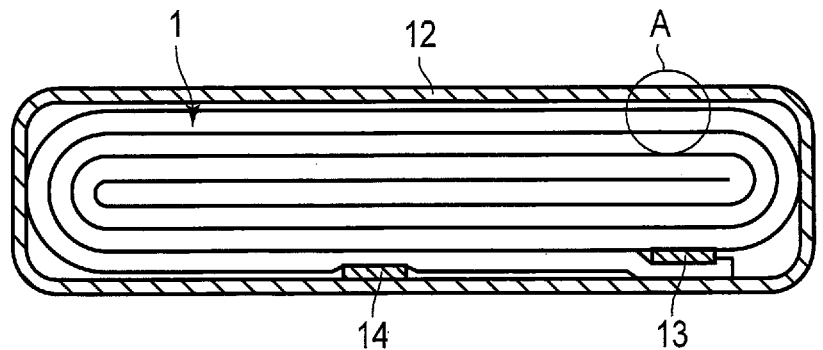
FIG. 1 is a cross-sectional view of a secondary battery according to an embodiment, taken perpendicularly to an extending direction of a terminal.

In general, according to one embodiment, a secondary battery including a positive electrode, a negative electrode, and a nonaqueous electrolyte is provided. The positive electrode includes a positive electrode active material-containing layer and a sulfur-containing layer provided on at least a part of the positive electrode active material-containing layer. The nonaqueous electrolyte includes a sulfur-containing compound consisting of at least one of a sulfur-containing imide compound or a sultone compound, or consisting of at least one of a sulfur-containing imide compound, a sultone compound or a propanesulfonic acid ester. The secondary battery satisfies the following expression (1):

$$1 \times 10^{-6} \le E/A \le 9 \times 10^{-4} \tag{1}$$

In expression (1), A denotes a mass of sulfur atoms per unit volume ($g/m^3$) of the sulfur-containing layer of the positive electrode, and E denotes a concentration (mol/L) of the sulfur-containing compound in the nonaqueous electrolyte.

According to another embodiment, a battery pack including the secondary battery of the embodiment is provided.

According to another embodiment, a vehicle including the battery pack of the embodiment is provided.

First Embodiment

According to a first embodiment, a secondary battery including a positive electrode, a negative electrode, and a nonaqueous electrolyte is provided. The positive electrode includes a positive electrode active material-containing layer and a sulfur-containing layer formed on at least a part of the positive electrode active material-containing layer. The nonaqueous electrolyte includes a sulfur-containing compound consisting of at least one of a sulfur-containing imide compound or a sultone compound, or consisting of at least one of a sulfur-containing imide compound, a sultone compound or a propanesulfonic acid ester. Also, the secondary battery satisfies the following expression (1):

$$1 \times 10^{-6} \le E/A \le 9 \times 10^{-4} \tag{1}$$

In expression (1), A denotes a mass of sulfur atoms per unit volume ($g/m^3$) of the sulfur-containing layer of the positive electrode, and E denotes a concentration (mol/L) of the sulfur-containing compound in the nonaqueous electrolyte.

As a result of conducting further intensive research, the inventors have found that the presence of a sulfur-containing compound consisting of at least one of a sulfur-containing imide compound or a sultone compound, or consisting of at least one of a sulfur-containing imide compound, a sultone compound or a propanesulfonic acid ester (hereinafter, said sulfur-containing compound will be referred to as a "sulfur-containing compound") in the nonaqueous electrolyte improves the life performance of the secondary battery. The mechanism therefor is assumed to be as follows. When the temperature is high, or especially under high temperature and high state-of-charge (SOC) conditions, a reaction between the nonaqueous electrolyte and the positive electrode progresses, causing oxidative decomposition of the nonaqueous electrolyte and gas generation. When a sulfur-containing compound is present in the nonaqueous electrolyte, the sulfur-containing compound will react with the positive electrode and be decomposed. Therefore, a reaction between the positive electrode and a component (such as a nonaqueous solvent) other than the sulfur-containing compound in the nonaqueous electrolyte can be suppressed. Also, when the sulfur-containing layer is present on at least a part of the positive electrode active material-containing layer, a reaction between the positive electrode and the nonaqueous electrolyte can be suppressed. E/A represents a balance between the amount of the sulfur-containing compound in the nonaqueous electrolyte and the amount of the sulfur-containing layer on the positive electrode active material-containing layer. For example, when E is small or A is large, E/A will be small. When E is large or A is small, E/A will be large. In each of these cases, a reaction between the positive electrode and a component of the nonaqueous electrolyte other than the sulfur-containing compound in the nonaqueous electrolyte progresses further than a reaction between the positive electrode and the sulfur-containing compound in the nonaqueous electrolyte; thus, gas generation or a resistance increase occurs. Since an E/A satisfying the range of expression (1) causes a reaction between the positive electrode and the sulfur-containing compound in the nonaqueous electrolyte to progress under high temperature and high SOC conditions, a reaction between the positive electrode and a component of the nonaqueous electrolyte other than the sulfur-containing compound under high temperature and high SOC conditions can be suppressed, and the protection function of the sulfur-containing layer for the positive electrode can also be enhanced. Therefore, gas generation under high temperature and high SOC conditions can be suppressed and an increase in the battery resistance can be suppressed. As a result, the life performance of the secondary battery can be improved.

Also, in the secondary battery of the embodiment, the negative electrode may include a negative electrode active material-containing layer and a sulfur-containing layer formed on at least a part of the negative electrode active material-containing layer. The secondary battery preferably satisfies the following expression (2):

$$2 \times 10^{-6} \leq E/D \leq 3 \times 10^{-4} \qquad (2)$$

In expression (2), D denotes a mass of sulfur atoms per unit volume $(g/m^3)$ of the sulfur-containing layer of the negative electrode, and E denotes a concentration (mol/L) of the sulfur-containing compound in the nonaqueous electrolyte.

Satisfying expression (2) can further improve the life performance of the secondary battery. The mechanism therefor is assumed to be as follows. In a high temperature environment, a reaction between the negative electrode and the nonaqueous electrolyte may also occur in addition to a reaction between the positive electrode and the nonaqueous electrolyte. Since satisfying expression (2) can promote a reaction between the negative electrode and the sulfur-containing compound in the nonaqueous electrolyte, a reaction between the negative electrode and a component of the nonaqueous electrolyte other than the sulfur-containing compound under high temperature conditions can be suppressed, and the protection function of the sulfur-containing layer for the negative electrode can also be enhanced. Therefore, gas generation under high temperature conditions can be suppressed and an increase in the battery resistance can be suppressed. As a result, the life performance of the secondary battery can be improved.

Hereinafter, the positive electrode, the negative electrode, the sulfur-containing layer, and the nonaqueous electrolyte will be described. The secondary battery of the embodiment may also include a separator and a container member in addition to these components. The configurations of the separator and the container member will also be described below.

1) Positive Electrode

The positive electrode may include a positive electrode current collector and a positive electrode active material-containing layer. The positive electrode active material-containing layer may be formed on either one or both surfaces of the positive electrode current collector. The positive electrode active material-containing layer may include a positive electrode active material, and optionally include a conductive agent and a binder.

For example, an oxide or a sulfide may be used as the positive electrode active material. The positive electrode may include, as the positive electrode active material, one kind of compound alone or two or more kinds of compounds in combination. Examples of the oxide and sulfide include compounds that allow Li or Li ions to be inserted thereinto and extracted therefrom.

Examples of such compounds include manganese dioxide $(MnO_2)$, iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphorus oxides having an olivine structure (e.g., $Li_xFePO_4$; $0<x\leq1$, $Li_xFe_{1-y}Mn_yPO_4$; $0<x\leq1$, $0<y\leq1$, and $Li_xCoPO_4$; $0<x\leq1$), ferrous sulfates $(Fe_2(SO_4)_3)$, vanadium oxides (e.g., $V_2O_5$), $LiNi_xCo_yM_zO_2$ $(x+y+z=1$, $x\geq0.8$; M consists of Mn and Al), and lithium nickel cobalt manganese composite oxides $(Li_xNi_{1-y-z}Co_yMn_zO_2$; $0<x\leq1$, $0<y<1$, $0<z<1$, $y+z<1$).

Examples of compounds more preferred as the positive electrode active material among the above compounds include: lithium manganese composite oxides having a spinel structure (e.g., $Li_xMn_2O4$; $0<x\leq1$), lithium manganese nickel composite oxides having a spinel structure $(Li_xMn_{2-y}Ni_yO4$; $0<x\leq1$, $0<y<2$), lithium nickel cobalt manganese composite oxides $(Li_xNi_{1-y-z}Co_yMn_zO_2$; $0<x\leq1$, $0<y<1$, $0<z<1$, $y+z<1$), and lithium phosphorus oxides having an olivine structure (e.g., $Li_xFePO_4$; $0<x\leq1$, $Li_xFe_{1-y}Mn_yPO_4$; $0<x\leq1$, $0<y\leq1$, and $Li_xCoPO_4$; $0<x\leq1$). Using these compounds as the positive electrode active material can enhance the battery voltage. Lithium nickel cobalt manganese composite oxides represented by $Li_xNi_{1-y-z}Co_yMn_zO_2$ wherein y and z are $0<y+z\leq0.2$ can realize a high energy density.

The primary particle size of the positive electrode active material is preferably 100 nm to 1 μm. A positive electrode active material having a primary particle size of 100 nm or more is easy to handle during industrial production. A positive electrode active material having a primary particle size of 1 μm or less enables diffusion of lithium ions in a solid to proceed smoothly.

The specific surface area of the positive electrode active material is preferably 0.1 $m^2/g$ to 10 $m^2/g$. A positive electrode active material having a specific surface area of 0.1 $m^2/g$ or more can secure sufficient sites for inserting and extracting Li ions. A positive electrode active material having a specific surface area of 10 $m^2/g$ or less is easy to handle during industrial production, and can secure good charge-and-discharge cycle performance.

The binder is added to fill gaps among the dispersed positive electrode active material and to bind the positive electrode active material with the positive current collector. Examples of the binder include polytetrafluoro ethylene (PTFE), polyvinylidene fluoride (PVdF), fluororubber, a polyacrylic acid compound, an imide compound, carboxymethyl cellulose (CMC), and salts of CMC. One of these may be used as the binder, or two or more of these may be used in combination as the binder.

The conductive agent is added to enhance current collecting performance and to suppress a contact resistance between the positive electrode active material and the positive electrode current collector. Examples of the conductive agent include vapor grown carbon fiber (VGCF), carbon black such as acetylene black, and carbonaceous materials such as graphite. One of these may be used as the conductive agent, or two or more of these may be used in combination as the conductive agent. The conductive agent may be omitted.

In the positive electrode active material-containing layer, the positive electrode active material and the binder are preferably blended at a ratio of 80% by mass to 98% by mass, and 2% by mass to 20% by mass, respectively.

Setting the amount of the binder to 2% by mass or more can provide sufficient electrode strength. The binder can serve as an insulator. Thus, setting the amount of the binder to 20% by mass or less reduces the amount of an insulator included in the electrode and thus can decrease the internal resistance.

When a conductive agent is to be added, the positive electrode active material, the binder, and the conductive agent are preferably blended at a ratio of 77% by mass to 95% by mass, 2% by mass to 20% by mass, and 3% by mass to 15% by mass, respectively.

Setting the amount of the conductive agent to 3% by mass or more can produce the above-described effects. Setting the amount of the conductive agent to 15% by mass or less can decrease the proportion of the conductive agent that contacts the electrolyte. If said proportion is low, decomposition of the electrolyte can be reduced during storage under high temperature.

The positive electrode current collector is preferably an aluminum foil, or an aluminum alloy foil containing one or more elements selected from Mg, Ti, Zn, Ni, Cr, Mn, Fe, Cu, and Si.

The thickness of the aluminum foil or aluminum alloy foil is preferably 5 μm to 20 μm, and more preferably 15 μm or less. The purity of the aluminum foil is preferably 99% by mass or more. The amount of a transition metal such as iron, copper, nickel, or chromium contained in the aluminum foil or aluminum alloy foil is preferably 1% by mass or less.

The positive electrode current collector may also include a portion that does not have the positive electrode active material-containing layer formed on its surface. This portion can serve as a positive electrode current-collecting tab.

To produce the positive electrode, for example, the positive electrode active material, the conductive agent, and the binder are suspended in a solvent to prepare a slurry. The slurry is applied to either one or both surfaces of the current collector. The applied slurry is then dried to obtain a stack of the active material-containing layer and the current collector. Thereafter, the stack is pressed. The positive electrode is thus produced. Alternatively, the positive electrode may be produced by the following method. First, the active material, the conductive agent, and the binder are mixed to obtain a mixture. Next, the mixture is formed into pellets. These pellets are then arranged on the current collector, whereby the positive electrode can be obtained.

2) Negative Electrode

The negative electrode may include a current collector and a negative electrode active material-containing layer. The negative electrode active material-containing layer may be formed on either one or both surfaces of the current collector. The negative electrode active material-containing layer may include a negative electrode active material, and optionally include a conductive agent and a binder.

The negative electrode active material is not particularly limited as long as it allows lithium or lithium ions to be inserted thereinto and extracted therefrom. One, or two or more kinds of negative electrode active materials may be used. Examples of the negative electrode active material include a titanium-containing oxide and a carbon material. Examples of the titanium-containing oxide include lithium titanates having a ramsdellite structure (e.g., $Li_{2+y}Ti_3O_7$, $0 \leq y \leq 3$), lithium titanates having a spinel structure (e.g., $Li_{4+x}Ti_5O_{12}$, $0 \leq x \leq 3$), monoclinic titanium dioxide ($TiO_2$), anatase-type titanium dioxide, rutile-type titanium dioxide, hollandite-type titanium composite oxides, orthorhombic titanium composite oxides, and niobium titanium composite oxides. The lithium-ion insertion-extraction electric potential of the titanium-containing oxide is 0.4 V (vs. $Li/Li^+$) or more.

Examples of the orthorhombic titanium-containing composite oxides include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb, and K, and M(II) is at least one selected from the group consisting of Zr, Sn, V, Nb, Ta, Mo, W, Y, Fe, Co, Cr, Mn, Ni, and Al. The respective subscripts in the composition formula are specified as follows: $0 \leq a \leq 6$, $0 \leq b < 2$, $0 \leq c < 6$, $0 \leq d < 6$, $-0.5 \leq \sigma \leq 0.5$. A specific example of the orthorhombic titanium-containing composite oxides is $Li_{2+a}Na_2Ti_6O_{14}$ ($0 \leq a \leq 6$).

Examples of the niobium titanium composite oxides include monoclinic niobium titanium composite oxides. Examples of the monoclinic niobium titanium composite oxides include compounds represented by $Li_xTi_{1-y}M1_yNb_{2-z}M2_zO_{7+\delta}$. Here, M1 is at least one selected from the group consisting of Zr, Si, and Sn, and M2 is at least one selected from the group consisting of V, Ta, and Bi. The respective subscripts in the composition formula are specified as follows: $0 < x \leq 5$, $0 \leq y < 1$, $0 \leq z < 2$, and $-0.3 \leq \delta \leq 0.3$. A specific example of the monoclinic niobium titanium composite oxides is $Li_xNb_2TiO_7$ ($0 \leq x \leq 5$).

Other examples of the monoclinic niobium titanium composite oxides include compounds represented by $Li_xTi_{1-y}M3_{y+z}Nb_{2-z}O_{7-\delta}$. Here, M3 is at least one selected from Mg, Fe, Ni, Co, W, Ta, and Mo. The respective subscripts in the composition formula are specified as follows: $0 \leq x \leq 5$, $0 \leq y < 1$, $0 \leq z < 2$, and $-0.3 \leq \delta \leq 0.3$.

Examples of the carbon material include graphite and hard carbon. When a carbon material is used in the negative electrode, a copper foil is used as the negative electrode current collector.

Among the negative electrode active materials, the monoclinic niobium titanium composite oxides have a lithium-ion insertion-extraction electric potential of around 1.0 V (vs. $Li/Li^+$), and can thus cause a decomposition reaction with a sulfur-containing compound to occur moderately. The lithium-ion insertion-extraction electric potential of the lithium titanate is around 1.4 V (vs. $Li/Li^+$), and the lithium-ion insertion-extraction electric potential of the carbon material is around 0 V (vs. $Li/Li^+$).

The conductive agent is added to enhance current collecting performance and to suppress a contact resistance between the active material and the current collector. Examples of the conductive agent include vapor grown carbon fiber (VGCF), carbon nanotube, carbon black such as acetylene black, and carbonaceous materials such as graphite. One of these may be used as the conductive agent, or two or more of these may be used in combination as the conductive agent. Alternatively, instead of using a conductive agent, a carbon coating or an electron-conductive inorganic material coating may be applied to the surface of the active material particles.

The binder is added to fill gaps among the dispersed active material and to bind the active material with the current collector. Examples of the binder include polytetrafluoro ethylene (PTFE), polyvinylidene fluoride (PVdF), fluororubber, styrene-butadiene rubber, a polyacrylic acid compounds, imide compounds, carboxymethyl cellulose (CMC), and salts of CMC. One of these may be used as the binder, or two or more of these may be used in combination as the binder.

As one example of the blending ratio of the active material, conductive agent and binder in the active material-containing layer, the negative electrode active material, the conductive agent, and the binder are preferably blended at a ratio of 68% by mass to 96% by mass, 2% by mass to 30% by mass, and 2% by mass to 30% by mass, respectively. Setting the amount of the conductive agent to 2% by mass or more can improve the current-collecting performance of the active material-containing layer. Also, setting the amount of the binder to 2% by mass or more provides sufficient binding between the active material-containing layer and the current collector, and excellent cycle performance can be expected. On the other hand, the amount of each of the conductive agent and the binder is preferably 30% by mass or less in view of increasing the capacity.

As the current collector, a material is used which is electrochemically stable at the electric potential at which lithium (Li) is inserted into and extracted from the active material. An example of the current collector for the case where a material having a lithium-ion insertion-extraction electric potential of 0.4 V (vs. Li/Li$^+$) or higher is used as the negative electrode active material is copper, nickel, stainless steel, aluminum, or an aluminum alloy containing at least one element selected from Mg, Ti, Zn, Mn, Fe, Cu, and Si. The thickness of the current collector is preferably 5 μm to 20 μm. A current collector having such a thickness can maintain a balance between the strength and the weight reduction of the electrode.

The current collector may also include a portion that does not have the negative electrode active material-containing layer formed on its surface. This portion can serve as a negative electrode current collecting tab.

The negative electrode can be produced, for example, by the following method. First, the active material, the conductive agent, and the binder are suspended in a solvent to prepare a slurry. The slurry is applied to either one or both surfaces of the current collector. The applied slurry is then dried to obtain a stack of the active material-containing layer and the current collector. Thereafter, the stack is pressed. The negative electrode is thus produced. Alternatively, the negative electrode may be produced by the following method. First, the active material, the conductive agent, and the binder are mixed to obtain a mixture. Next, the mixture is formed into pellets. These pellets are then arranged on the current collector, whereby the negative electrode can be obtained.

3) Sulfur-Containing Layer

The sulfur-containing layer is present on at least a part of a surface of the positive electrode active material-containing layer. The sulfur-containing layer may be present on at least a part of a surface of the negative electrode active material-containing layer.

The sulfur-containing layer is formed when a sulfur-containing compound decomposes on the positive electrode active material-containing layer or the negative electrode active material-containing layer. The sulfur-containing compound consists of at least one of a sulfur-containing imide compound or a sultone compound, or consists of at least one of a sulfur-containing imide compound, a sultone compound or a propanesulfonic acid ester.

Examples of the sulfur-containing imide compound include lithium bis(trifluoromethanesulfonyl)imide (LiTFSI), lithium bis(fluorosulfonyl)imide (LiFSI), lithium bis(fluoromethanesulfonyl)amide (LiFSA), and lithium bis (trifluoromethanesulfonyl)amide (LiTFSA). The sulfur-containing compound may include one, or a mixture of two or more selected from the group consisting of these compounds.

Examples of the sultone compound include 1,3-propane sultone (PS), 1,4-butane sultone, 1,3-propene sultone, and 2,4-butane sultone. The sulfur-containing compound may include one, or a mixture of two or more selected from the group consisting of these compounds.

Preferred among the sulfur-containing compounds is the sultone compound. This is because while the sulfur-containing compound undergoes decomposition reaction prior to decomposition reaction of the electrolyte, suppressing gas generation, the sultone compound has suitable decomposition potential.

The sulfur-containing layer may include other kinds of atoms in addition to sulfur atoms (S). Examples of other kinds of atoms include oxygen atoms (O) and carbon atoms (C).

When the sulfur-containing layer is formed on at least a part of the positive electrode active material-containing layer, a mass A of sulfur atoms per unit volume (g/m$^3$) of the sulfur-containing layer can be set in a range of greater than 0 (g/m$^3$) to 3500 (g/m$^3$) or less. With A in this range, the sulfur-containing layer does not inhibit insertion and extraction of lithium ions performed by the positive electrode, allowing for suppression of an increase in the positive electrode resistance. A preferred value of the upper limit of A is 3260 (g/m$^3$). To fully achieve the protection function of the sulfur-containing layer for the positive electrode, the lower limit of A is preferably 430 (g/m$^3$).

When the sulfur-containing layer is formed on at least a part of the negative electrode active material-containing layer, a mass D of sulfur atoms per unit volume (g/m$^3$) of the sulfur-containing layer can be set in a range of greater than 0 (g/m$^3$) to 6600 (g/m$^3$) or less. With D in this range, the sulfur-containing layer does not inhibit insertion and extraction of lithium ions performed by the negative electrode, allowing for suppression of an increase in the negative electrode resistance. A preferred value of the upper limit of D is 4720 (g/m$^3$). To fully achieve the protection function of the sulfur-containing layer for the negative electrode, the lower limit of D is preferably 700 (g/m$^3$).

4) Nonaqueous Electrolyte

The nonaqueous electrolyte includes a sulfur-containing compound consisting of at least one of a sulfur-containing imide compound or a sultone compound, or consisting of at least one of a sulfur-containing imide compound, a sultone compound or a propanesulfonic acid ester.

For example, a liquid nonaqueous electrolyte or a gel nonaqueous electrolyte may be used as a nonaqueous electrolyte. The liquid nonaqueous electrolyte includes an electrolyte salt, an organic solvent which can dissolve the electrolyte salt, and a sulfur-containing compound. The concentration of the electrolyte salt is preferably 0.5 mol/L to 2.5 mol/L. The sulfur-containing compound may serve as an electrolyte salt or an organic solvent.

Each of the sulfur-containing imide compound and the sultone compound may or may not have a function as an electrolyte salt or an organic solvent. Examples of the sulfur-containing imide compound and the sultone compound are as described in connection with the sulfur-containing layer.

The concentration (mol/L) E of the sulfur-containing compound in the nonaqueous electrolyte can be set in a range of greater than 0 (mol/L) to $4.5 \times 10^{-1}$ (mol/L) or less. With E in this range, the ion conductivity of the nonaqueous electrolyte can fall within a proper range. A preferred value of the upper limit of E is $1.6 \times 10^{-1}$ (mol/L). To enhance the effect of suppressing gas generation and a resistance increase, the lower limit of E is preferably $8.2 \times 10^{-2}$ (mol/L).

Examples of the electrolyte salt include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethanesulfonate ($LiCF_3SO_3$), LiTFSI and LiFSI, and mixtures thereof. The electrolyte salt is preferably less likely to be oxidized even at high potentials, and $LiPF_6$ is most preferred.

Examples of the organic solvent include: cyclic carbonates such as propylene carbonate (PC), ethylene carbonate (EC), and vinylene carbonate (VC); linear carbonates such as diethyl carbonate (DEC), dimethyl carbonate (DMC), methyl ethyl carbonate (MEC) and propione methyl carbonate (PMC); cyclic ethers such as tetrahydrofuran (THF), 2-methyl tetrahydrofuran (2-MeTHF), and dioxolane (DOX); linear ethers such as dimethoxy ethane (DME) and diethoxy ethane (DEE); γ-butyrolactone (GBL); acetonitrile (AN); sulfolane (SL); and ethyl propionate (EP). These organic solvents may be used alone or in the form of a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Other than the liquid nonaqueous electrolyte and the gel nonaqueous electrolyte, a room temperature molten salt (ionic melt) including lithium ions, a polymer solid electrolyte, an inorganic solid electrolyte, and the like may also be used as the nonaqueous electrolyte.

The nonaqueous electrolyte included in the secondary battery of the embodiment may further include a propanesulfonic acid ester. With inclusion of a propanesulfonic acid ester, the effect of suppressing gas generation under high temperature and high SOC conditions during high-temperature storage can be increased, whereby an increase in the battery resistance can be further suppressed. As a result, the life performance of the secondary battery can be further enhanced. Examples of the propanesulfonic acid ester include at least one selected from the group consisting of methyl propanesulfonate, ethyl propanesulfonate, and propyl propanesulfonate.

The nonaqueous electrolyte may include both of a sultone compound and a propanesulfonic acid ester as a sulfur-containing compound. In the total ion chromatogram of the nonaqueous electrolyte according to gas chromatograph-mass spectrometry (GC-MS), a peak area value B of the propanesulfonic acid ester is preferably 0.01 to 40 when a peak area value A of the sultone compound is set to 10. Setting the peak area value B to 0.01 to 40 can suppress the amount of gas generated when the secondary battery is used at high temperature or under high-temperature and high SOC conditions while suppressing the resistance value of the secondary battery to a low value. A more preferred range of the peak area value B is 0.2 to 20. A method of gas chromatograph-mass spectrometry will be explained later.

5) Separator

The separator is made of, for example, a porous film or a synthetic resin nonwoven fabric including polyethylene (PE), polypropylene (PP), cellulose, or polyvinylidene fluoride (PVdF). In view of safety, a porous film made of polyethylene or polypropylene is preferably used. This is because such a porous film melts at a fixed temperature and thus is able to shut off current.

An electrolyte layer including an inorganic solid electrolyte may be used as the separator. Examples of the lithium-ion conductive inorganic solid electrolyte include a lithium-ion conductive oxide-based solid electrolyte or a lithium-ion conductive sulfide-based solid electrolyte. Examples of the lithium-ion conductive oxide-based solid electrolyte include a lithium phosphoric acid solid electrolyte having a NASICON-type structure, amorphous LIPON ($Li_{2.9}PO_{3.3}N_{0.46}$), and LLZ ($Li_7La_3Zr_2O_{12}$) having a garnet-type structure.

6) Container Member

For example, a container made of a laminate film or a metallic container may be used as the container member.

The thickness of the laminated film is, for example, 0.5 mm or less, and preferably 0.2 mm or less.

As the laminated film, a multilayer film including multiple resin layers and a metal layer interposed between the resin layers is used. The resin layer includes, for example, a polymeric material such as polypropylene (PP), polyethylene (PE), nylon, or polyethylene terephthalate (PET). The metal layer is preferably made of an aluminum foil or an aluminum alloy foil for reduction in weight. The laminated film may be formed into the shape of the container member by heat-sealing.

The wall thickness of the metallic container is, for example, 1 mm or less, more preferably 0.5 mm or less, and still more preferably 0.2 mm or less.

The metallic container is made, for example, of aluminum, an aluminum alloy or the like. The aluminum alloy preferably contains an element(s) such as magnesium, zinc, silicon, and the like. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), prismatic, cylindrical, coin-shaped, button-shaped, or the like. The container member can be suitably selected depending on the size of the battery or the use of the battery.

A method of measuring a mass of sulfur atoms per unit volume (g/m$^3$) of the sulfur-containing layer and a concentration (mol/L) of the sulfur-containing compound in the nonaqueous electrolyte will be described below.

The container member of the secondary battery having a state of charge (SOC) of 50% is opened to take out an electrode group. The jig (e.g., tape) that bundles the electrode group is detached, and if the outermost layer is a separator, the separator is flipped to take out the electrode (e.g., negative electrode) at the first layer. Then, another separator is flipped to take out the counter electrode (e.g., positive electrode) at the first layer. Flipping of the separator to take out the electrode is repeated to take out all the positive electrodes and the negative electrodes constituting the electrode group. The removed electrodes and separators are centrifugalized to extract the nonaqueous electrolyte. The concentration of the sulfur-containing compound in the nonaqueous electrolyte is measured according to inductively coupled plasma (ICP) emission spectrometry.

On the other hand, when measuring the mass of the sulfur atoms per unit volume of the sulfur-containing layer, each of the centrifugalized positive electrodes and negative electrodes is washed with methyl ethyl carbonate (MEC) and vacuum-dried. Each electrode is punched out into a fixed area (2×2 cm$^2$), followed by the addition of a fixed amount of pure water (10 cc) thereto and performance of ultrasonic irradiation for 30 minutes or longer. By analyzing the liquid extracted therefrom according to ICP and measuring the amount of S in the extraction liquid, the mass of the sulfur atoms per unit volume of the sulfur-containing layer of each electrode is obtained.

The gas chromatograph-mass spectrometry (GC-MS) of the nonaqueous electrolyte will be explained.

The nonaqueous electrolyte extracted by the above method is diluted by acetonitrile to have a twentyfold volume. A GCMS measurement is performed on the measurement sample under the conditions shown in Table 1A below.

TABLE 1A

| Apparatus | Item | Condition |
|---|---|---|
| GC | Injection amount | 1 uL |
| | Column | Ultra Alloy CW 40 m 0.25 mm 0.25 μm |
| | Temperature | 40° C. (Two-minute retention), 10° C./min Temperature increase, 240° C. (10 min) |
| | Split ratio | 1:50 |
| | He flow rate | 1.0 mL/min |
| MS | Mass range | 10-600 m/z |

Components included in the measurement sample can be identified from a mass spectrum of the measurement sample. For example, peaks appearing at m/z 122.65 and 58 in the mass spectrum originate from propane sultone. Peaks appearing at m/z 124, 111, and 83 in the mass spectrum originate from ethyl propanesulfonate.

Based on the result of the mass spectrum, a peak area value A of a sultone compound such as propane sultone and a peak area value B of a propanesulfonic acid ester such as ethyl propanesulfonate are obtained in the total ion chromatogram (TIC) of the measurement sample. The peak area value B when the peak area value A is set to 10 is calculated.

An example of the secondary battery of the embodiment will be described with reference to FIGS. 1 to 4.

Figure 2:
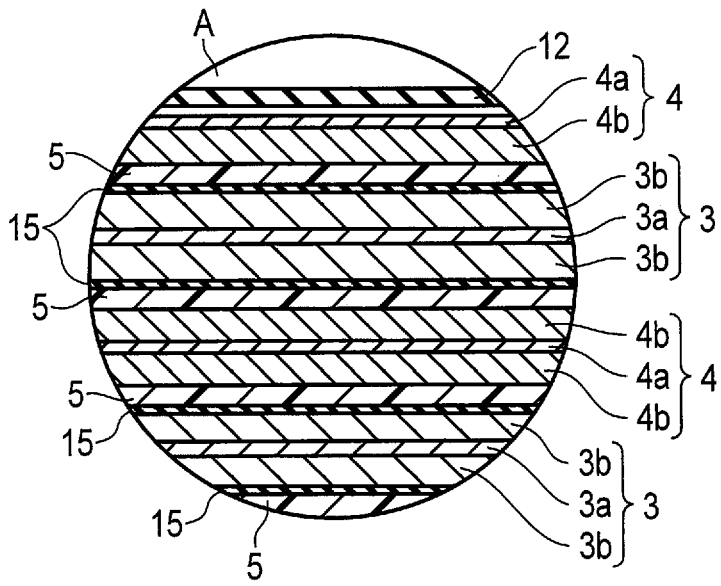
FIG. 2 is an enlarged cross-sectional view of the portion A shown in FIG. 1.

FIGS. 1 and 2 show an example of a secondary battery which uses a container member made of a laminated film.

As shown in FIGS. 1 and 2, a flat wound electrode group 1 is housed in a bag-form container member 12 made of a laminated film having two resin films and a metal layer interposed therebetween. The flat wound electrode group 1 is formed by spirally winding a stack obtained by stacking a negative electrode 4, a separator 5, a positive electrode 3, and a separator 5 in the mentioned order from the outer side, about an axis parallel to the short-side direction of the stack, and then press-forming the wound stack. The negative electrode 4 at the outermost layer has a structure in which a negative electrode layer (negative electrode active material-containing layer) 4b containing a negative electrode active material is formed on one surface of a negative electrode current collector 4a that is on the internal surface side, as shown in FIG. 2; and the other negative electrodes 4 have a structure in which the negative electrode layer 4b is formed on both surfaces of the negative electrode current collector 4a. The positive electrode 3 is configured so that a positive electrode layer (positive electrode active material-containing layer) 3b is formed on both surfaces of a positive electrode current collector 3a.

In the vicinity of the outer peripheral edge of the wound electrode group 1, a negative electrode terminal 13 is connected to the negative electrode current collector 4a of the negative electrode 4 at the outermost layer, and a positive electrode terminal 14 is connected to the positive electrode current collector 3a of the positive electrode 3 on the inner side. The negative electrode terminal 13 and the positive electrode terminal 14 are extended out from an opening of the bag-form container member 12. The wound electrode group 1 is sealed by heat-sealing the opening of the bag-form container member 12. When heat-sealing the opening of the bag-form container member 12, the negative electrode terminal 13 and the positive electrode terminal 14 are held by the bag-form container member 12 at the opening thereof. The sulfur-containing layer 15 is formed on a part of a surface of the positive electrode active material-containing layer 3b and is in contact with the separator 5.

FIGS. 3 and 4 show an example of a secondary battery which uses a metallic container.

An electrode group 1 is housed in a metallic container 2 having a rectangular tubular shape. The electrode group 1 is formed by, for example, interposing the separator 5 between the positive electrode 3 and the negative electrode 4 and winding the stack of the positive electrode 3, the separator 5 and the negative electrode 4 into a flat spiral shape about an axis parallel to the short-side direction of the stack. A sulfur-containing layer (not shown) is formed on a part of a surface of the positive electrode active material-containing layer 3b and is in contact with the separator 5. As shown in FIG. 4, strip-shaped positive electrode leads 6 are electrically connected to multiple portions of an edge of the positive electrode 3, respectively, that is positioned on an end face of the electrode group 1 intersecting with the stacking direction of the electrode. Strip-shaped negative electrode leads 7 are also electrically connected to multiple portions of an edge of the negative electrode 4, respectively, that is positioned on said end face. A bundle of the positive electrode leads 6 is electrically connected to a positive electrode current collecting tab 8. A positive electrode terminal is formed of the positive electrode leads 6 and the positive electrode current collecting tab 8. A bundle of negative electrode leads 7 are connected to a negative electrode current collecting tab 9. A negative electrode terminal is formed of the negative electrode leads 7 and the negative electrode current collecting tab 9. A sealing plate 10 made of metal is fixed to an opening of the metallic container 2 by welding or the like. The positive electrode current collecting tab 8 and the negative electrode current collecting tab 9 are respectively drawn out from outlet holes provided in the sealing plate 10. The inner peripheral surface of each outlet hole of the sealing plate 10 is coated with an insulating member 11 in order to prevent a short circuit from occurring due to a contact between the positive electrode current collecting tab 8 and the negative electrode current collecting tab 9.

A method of producing the secondary battery of the embodiment will be described with reference to FIG. 5. FIG. 5 is a schematic diagram illustrating an outline of a method of producing a secondary battery which uses a bag-form container member made of a laminated film.

First, the separator 5 is arranged between the positive electrode 3 with no sulfur-containing layer formed thereon and the negative electrode 4 with no sulfur-containing layer formed thereon, to produce the electrode group 1. The positive electrode terminal 14 is electrically connected to the positive electrode 3 of the electrode group 1, and the negative electrode terminal 13 is electrically connected to the negative electrode 4 of the electrode group 1.

After the electrode group 1 having the positive and negative electrode terminals 13 and 14 are housed in the bag-form container member 12 made of a laminated film, an edge 21b, excluding a first edge 21a, is heat-sealed. Next, the nonaqueous electrolyte is poured into the bag-form container member 12 from the first edge 21a, and the first edge 21a is heat-sealed under reduced pressure. Through this procedure, a secondary battery 30 subjected to the first sealing is obtained.

The secondary battery 30 subjected to the first sealing is then subjected to initial charging-discharging at an ambient temperature (e.g., 25° C.), followed by aging at a temperature equal to or greater than the ambient temperature. The aging temperature can be, for example, in a range of 30° C. to 80° C. Through the initial charging-discharging and the aging, the sulfur-containing layer 15 is formed on at least a part of a surface of the positive electrode active material-containing layer 3b. At this time, adjusting the state of charge (SOC) of the battery, the electric potential of the negative electrode, the aging temperature, the time, and the like can form a sulfur-containing layer on at least a part of a surface of the negative electrode active material-containing layer 4b.

After the aging, the temperature of the secondary battery 30 is returned to an ambient temperature, and then an unsealed portion of the bag-form container member 12 is cut along a section line 22 on an inner side relative to the first edge 21a to open the bag-form container member 12 in an argon atmosphere, thereby releasing the gas inside the bag-form container member 12 to the outside. The portion cut out from the bag-form container member 12 along the section line 22 is indicated by a reference numeral "23".

Next, a sulfur-containing compound or a nonaqueous electrolyte including a sulfur-containing compound is supplied into the bag-form container member 12, and second sealing to seal an edge 24 along the section line 22 under reduced pressure (e.g., −90 kPa) is performed. The sulfur-containing compound in the nonaqueous electrolyte is consumed by the formation of the sulfur-containing layer; however, the concentration of the sulfur-containing compound in the nonaqueous electrolyte can be set in a target range by refilling a sulfur-containing compound or a nonaqueous electrolyte containing a sulfur-containing compound after the consumption. Therefore, by adjusting the production conditions such as the temperature, time, SOC or the like in the initial charging-discharging step or the aging step, the amount of the sulfur-containing compound refilled, and the like, E/A can be set in a target range. Through this procedure, a secondary battery 31 of the embodiment is obtained.

If a propanesulfonic acid ester is to be included in the nonaqueous electrolyte of the secondary battery of the embodiment, the aging temperature in the above-described method is preferably set in a range of higher than 95° C. to 120° C. or less. Setting the aging temperature in this range can promote a reaction between an organic solvent and a sultone compound such as propane sultone and prompt generation of a propanesulfonic acid ester. Ethyl propane-sulfonate can be obtained by using, for example, a sultone compound and an organic solvent including DEC and/or EP. Methyl propanesulfonate can be obtained by using, for example, a sultone compound and an organic solvent including MEC. On the other hand, propyl propanesulfonate can be obtained by using, for example, a sultone compound and an organic solvent including PC. The concentration of the sulfur-containing compound in the nonaqueous electrolyte can be set in a target range by refilling a sultone compound or a nonaqueous electrolyte including a sultone compound in order to compensate for the sultone compound consumed in the aging step.

Instead of the above method, a propanesulfonic acid ester may be contained in the nonaqueous electrolyte by the following method. That is, a propanesulfonic acid ester can be contained in the nonaqueous electrolyte by containing a propanesulfonic acid ester in the nonaqueous electrolyte that is injected for the first time before the first sealing is performed in the above method. In this case, refilling of a sultone compound can be omitted after releasing gas.

Since the secondary battery of the first embodiment described above satisfies expression (1): $(1 \times 10^{-6} \leq E/A \leq 9 \times 10^{-4})$, it can suppress the amount of gas generation and the resistance increase that occur under high temperature and can achieve excellent life performance even at high temperature.

Second Embodiment

A battery pack according to a second embodiment may include the secondary battery (single battery) according to the embodiment in a single number or plural numbers. A plurality of secondary batteries may be electrically connected in series, in parallel, or in a combination of in-series connection and in-parallel connection, to constitute a battery module. The battery pack according to the embodiment may include a plurality of battery modules.

The battery pack according to the embodiment may further include a protective circuit. The protective circuit functions to control charge and discharge of the secondary battery. Alternatively, a circuit included in devices (such as electronic devices, automobiles and the like) that use a battery pack as a power source may be used as the protective circuit of the battery pack.

The battery pack according to the embodiment may further include an external power distribution terminal. The external power distribution terminal is configured to output current from the secondary battery to the outside and to input current into the secondary battery. In other words, when the battery pack is used as a power source, current is supplied to the outside via the external power distribution terminal. When charging the battery pack, charge current (including regenerative energy of a motive force of vehicles such as automobiles) is supplied to the battery pack through the external power distribution terminal.

FIGS. 6 and 7 show an example of a battery pack 50. The battery pack 50 includes a plurality of flat batteries having the structure shown in FIG. 6. FIG. 6 is an exploded perspective view of the battery pack 50. FIG. 7 is a block diagram showing an electric circuit of the battery pack 50 shown in FIG. 6.

A plurality of single batteries 51 are stacked such that the negative electrode terminal 13 and positive electrode terminal 14 extending outward are aligned in the same direction, and are fastened with an adhesive tape 52, to thereby constitute a battery module 53. These single batteries 51 are electrically connected to each other in series, as shown in FIG. 7.

A printed wiring board 54 is arranged facing the side surfaces of the single batteries 51 from which the negative electrode terminals 13 and the positive electrode terminals 14 extend. A thermistor 55, a protective circuit 56, and a power distribution terminal 57 for energizing an external device as the external power distribution terminal are mounted on the printed wiring board 54 as shown in FIG. 7. An insulating plate (not shown) is attached to the surface of the printed wiring board 54 facing the battery module 53 to avoid unnecessary connection with the wires of the battery module 53.

A positive electrode-side lead 58 is connected to the positive electrode terminal 14 positioned at the bottom layer of the battery module 53 and the distal end of the positive electrode-side lead 58 is inserted into a positive electrode-side connector 59 of the printed wiring board 54 so as to be electrically connected. A negative electrode-side lead 60 is connected to the negative electrode terminal 13 positioned at the top layer of the battery module 53 and the distal end of the negative electrode-side lead 60 is inserted into a negative electrode-side connector 61 of the printed wiring board 54 so as to be electrically connected. The connectors 59 and 61 are connected to the protective circuit 56 through wires 62 and 63 formed on the printed wiring board 54.

The thermistor 55 detects the temperature of the single batteries 51, so that the detection signals are transmitted to the protective circuit 56. The protective circuit 56 can shut down a plus-side wire 64a and a minus-side wire 64b between the protective circuit 56 and the power distribution terminal 57 for energizing an external device as the external power distribution terminal under a predetermined condition. The predetermined condition is, for example, a case where the temperature detected by the thermistor 55 reaches a predetermined temperature or higher. The predetermined condition is also a case where overcharge, overdischarge, over-current, or the like of the single batteries 51 is detected. The detection of the overcharge or the like is performed for the individual single batteries 51 or the single batteries 51 as a whole. In the case of detecting the individual single batteries 51, a battery voltage may be detected, or a positive electrode potential or a negative electrode potential may be detected. In the latter case, a lithium electrode used as a reference electrode is inserted into each single battery 51. In the instance shown in FIGS. 6 and 7, a wire 65 for voltage detection is connected to each of the single batteries 51, and detection signals are transmitted to the protective circuit 56 through the wire 65.

Protective sheets 66 made of rubber or resin are arranged on three side surfaces of the battery module 53, excluding the side surface from which the positive electrode terminal 14 and the negative electrode terminal 13 protrude.

The battery module 53 is housed in the housing container 67 together with each protective sheet 66 and the printed wiring board 54. That is, the protective sheets 66 are arranged on both of the inner side surfaces in the long-side direction and an inner side surface in the short-side direction of the housing container 67, and the printed wiring board 54 is disposed on the opposite inner side surface in the short-side direction. The battery module 53 is positioned in a space surrounded by the protective sheets 66 and the printed wiring board 54. A lid 68 is attached to an upper surface of the housing container 67.

In order to fix the battery module 53, a heat-shrinkable tape may be used in place of an adhesive tape 52. In this case, the battery module is bound by placing the protective sheets on both sides of the battery module, winding the heat-shrinkable tape around the battery module, and then thermally shrinking the heat-shrinkable tape.

FIGS. 6 and 7 show the configuration in which the single batteries 51 are connected in series; however, the single batteries 51 may be connected in parallel to increase the battery capacity. Alternatively, the single batteries 51 may be connected in a combination of in-series connection and in-parallel connection. The assembled battery packs can also be connected in series or in parallel.

The battery pack shown in FIGS. 6 and 7 includes a single battery module; however, the battery pack according to the embodiment may include a plurality of battery modules. The plurality of battery modules are electrically connected in series, in parallel, or in a combination of in-series connection and in-parallel connection.

The form of the battery pack can be appropriately changed depending on the application. The battery pack according to the embodiment is suitably used in applications where excellent cycle performance is demanded when a large current is extracted. Specifically, the battery pack is used as a power source of a digital camera, a battery of a vehicle such as a two- or four-wheeled hybrid electric automobile, a two- or four-wheeled electric automobile, an electric bicycle, or a railway vehicle (such as an electric train), or a stationary battery. In particular, the battery pack is suitably used as an in-vehicle battery installed in vehicles.

Since the battery pack of the second embodiment described above includes the secondary battery of the embodiment, it can suppress gas generation and an increase in the battery resistance occurring under high temperature, and can achieve excellent life performance even under high temperature.

Third Embodiment

A vehicle of a third embodiment includes one, or two or more of the secondary battery of the embodiment, or includes the battery pack of the embodiment.

In a vehicle, such as an automobile, including the battery pack according to the third embodiment, it is preferable that the battery pack, for example, recover regenerative energy of a motive force of the vehicle. The vehicle may include a mechanism configured to convert kinetic energy of the vehicle into regenerative energy.

FIG. 8 shows an example of an automobile including an example battery pack according to the embodiment.

An automobile 71 shown in FIG. 8 includes an example battery pack 72 according to the embodiment in the engine compartment in a front part of the automobile. The place where the battery pack is installed in the automobile is not limited to the engine compartment. For example, the battery pack may be installed in a rear part of the automobile or under a seat.

Figure 9:
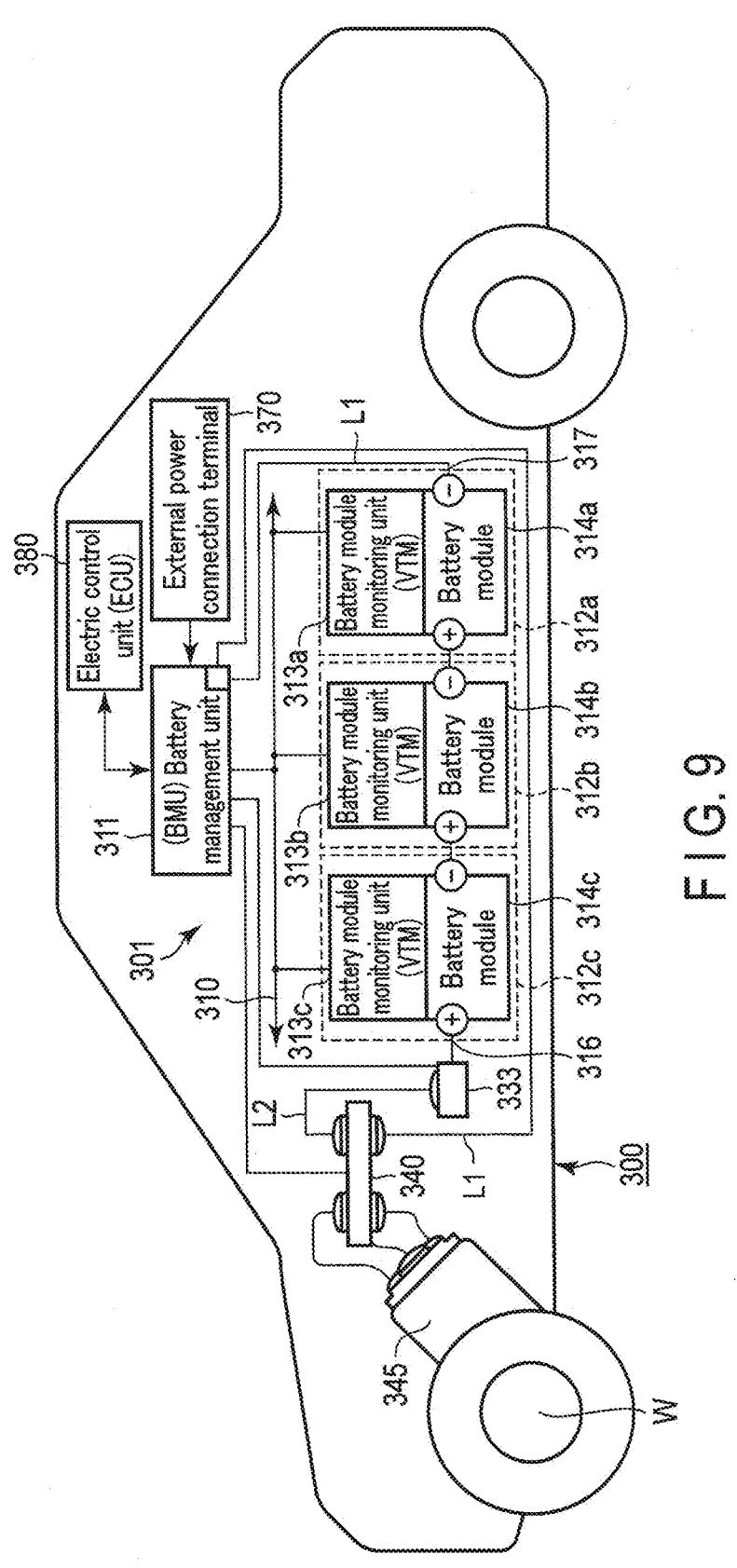
FIG. 9 is a diagram schematically showing another example of the vehicle according to the embodiment.

FIG. 9 is a diagram schematically showing an example configuration of the vehicle according to the embodiment. A vehicle 300 shown in FIG. 9 is an electric automobile.

The vehicle 300 shown in FIG. 9 includes a vehicle power source 301, a vehicle electric control unit (ECU) 380, which is a master controller of the vehicle power source 301, an external terminal 370, an inverter 340, and a drive motor 345.

The vehicle 300 includes the vehicle power source 301 in the engine compartment, in a rear part of the automobile or under a seat, for example. FIG. 9, however, schematically shows an installing position of the secondary battery in the vehicle 300.

The vehicle power source 301 includes a plurality of (e.g., three) battery packs 312a, 312b, and 312c, a battery management unit (BMU) 311, and a communication bus 310.

The three battery packs 312a, 312b, and 312c are electrically connected in series. The battery pack 312a includes a battery module 314a and a voltage temperature monitor (VTM) 313a. The battery pack 312b includes a battery module 314b and a voltage temperature monitor 313b. The battery pack 312c includes a battery module 314c and a voltage temperature monitor 313c. The battery packs 312a, 312b, and 312c are removable independently of each other, and each can be replaced with a different battery pack.

Each of the battery modules 314a to 314c includes a plurality of secondary batteries electrically connected in series. Each of the secondary batteries is the secondary battery according to the embodiment. The battery modules 314a to 314c each perform charge and discharge via a positive electrode terminal 316 and a negative electrode terminal 317.

To collect information related to maintenance of the vehicle power source 301, the battery management unit 311 communicates with the voltage temperature monitors 313a to 313c and collects information on the voltage, temperature, and the like of the secondary batteries of the battery modules 314a to 314c included in the vehicle power source 301.

The battery management unit 311 and the voltage temperature monitors 313a to 313c are connected via the communication bus 310. The communication bus 310 is configured to share a set of communication wires with a plurality of nodes (a battery management unit and at least one voltage temperature monitor). The communication bus 310 is, for example, a communication bus configured based on the control area network (CAN) standard.

The voltage temperature monitors 313a to 313c measure a voltage and a temperature of individual secondary batteries constituting the battery modules 314a to 314c based on commands received from the battery management unit 311 through communication. The temperature may be measured only at several points per battery module, and it is not necessary to measure the temperatures of all the secondary batteries.

The vehicle power source 301 may also include an electromagnetic contactor (such as a switch unit 333 shown in FIG. 9) configured to switch on and off a connection between the positive electrode terminal and the negative electrode terminal. The switch unit 333 includes a pre-charge switch (not shown) which turns on when the battery modules 314a to 314c are charged, and a main switch (not shown) which turns on when the output from the battery is supplied to a load. The pre-charge switch and the main switch include a relay circuit (not shown), which is turned on and off based on a signal supplied to a coil disposed near the switch elements.

The inverter 340 converts an input direct current voltage into a high voltage of a three-phase alternate current (AC) for driving a motor. The output voltage from the inverter 340 is controlled based on a control signal from the battery management unit 311 (described later) or the vehicle ECU 380 (described later) configured to control the entire operation of the vehicle. Three-phase output terminals of the inverter 340 are respectively connected to three-phase input terminals of the drive motor 345.

The drive motor 345 is rotated by electric power supplied from the inverter 340, and transmits the rotation to axles and drive wheels W via, for example, a differential gear unit.

The vehicle 300 also includes a regenerative brake mechanism (not shown) configured to rotate the drive motor 345 when the vehicle 300 is braked, and convert kinetic energy into regenerative energy as electric energy. The regenerative energy recovered in the regenerative brake mechanism is input to the inverter 340 and converted into a direct current. The direct current is input to the vehicle power source 301.

One of the terminals of a connection line L1 is connected to the negative electrode terminal 317 of the vehicle power source 301 via a current detector (not shown) included in the battery management unit 311. The other of the terminals of the connection line L1 is connected to a negative electrode input terminal of the inverter 340.

One of the terminals of a connection line L2 is connected to the positive electrode terminal 316 of the vehicle power source 301 via the switch unit 333. The other of the terminals of the connection line L2 is connected to a positive electrode input terminal of the inverter 340.

The external terminal 370 is connected to the battery management unit 311 (described later). The external terminal 370 can be connected to, for example, an external power source.

The vehicle ECU 380 controls the battery management unit 311 cooperatively with other apparatuses in response to operation input from a driver, etc., and thereby manages the entire vehicle. Data related to maintenance of the vehicle power source 301, such as a remaining capacity of the vehicle power source 301, is transferred between the battery management unit 311 and the vehicle ECU 380 through a communication line.

Since the vehicle according to the embodiment includes battery packs which include the secondary battery according to the embodiment, and the battery packs (e.g., battery packs 312a, 312b, and 312c) have excellent life performance, a vehicle excellent in charge-and-discharge performance and high in reliability can be obtained. In addition, the battery packs are inexpensive and highly safe, and thus can suppress the costs of the vehicle and enhance the safety of the vehicle.

EXAMPLES

Hereinafter, examples of the present invention will be described in detail with reference to the accompanying drawings, but the embodiments of the present invention are not limited to the examples shown below.

Example 1

A secondary battery was produced according to the procedure described below.
<Production of Positive Electrode>

A lithium nickel composite oxide ($LiNi_{0.8}Co_{0.1}Mn_{0.1}O_2$) powder was provided as a positive electrode active material. Acetylene black was provided as a conductive agent. Polyvinylidene fluoride (PVdF) was provided as a binder. Then, the positive electrode active material, the conductive agent, and the binder were mixed in N-methylpyrrolidone (NMP) at a ratio of 90 parts by weight:10 parts by weight:10 parts by weight, whereby a positive electrode slurry was prepared. The positive electrode slurry was applied onto both surfaces of a current collector made of an aluminum foil having a thickness of 15 µm. Then, the coating was dried in a temperature-controlled bath at 120° C. to form a positive electrode active material-containing layer, followed by pressing of the positive electrode active material-containing layer. Thereby, the positive electrode was obtained.
<Production of Negative Electrode>

A niobium titanium composite oxide ($Nb_2TiO_7$) powder was provided as a negative electrode active material. The average secondary particle size of the niobium titanium composite oxide was 7.5 µm. The specific surface area of the niobium titanium composite oxide was 4.0 m²/g. In addition, acetylene black was provided as a conductive agent, and polyvinylidene fluoride (PVdF) was provided as a binder. Then, the negative electrode active material, the conductive agent, and the binder were mixed in N-methylpyrrolidone (NMP) at a ratio of 90 parts by weight:10 parts by weight:10 parts by weight, whereby a negative electrode slurry was prepared. The negative electrode slurry was applied onto both surfaces of a current collector made of an aluminum foil having a thickness of 15 μm. Then, the coating was dried in a temperature-controlled bath at 120° C. to form a negative electrode active material-containing layer, followed by pressing of the negative electrode active material-containing layer. Thereby, the negative electrode was obtained.

<Production of Electrode Group>

Two non-woven fabrics made of polyethylene and having a thickness of 25 μm were provided as a separator. Next, the positive electrode, separator, negative electrode, and separator were stacked in this order to obtain a stack. Then, the stack was spirally wound. The wound stack was subjected to hot pressing at 80° C., whereby a flat electrode group was produced. A positive electrode terminal was electrically connected to the positive electrode of the electrode group. A negative electrode terminal was electrically connected to the negative electrode of the electrode group.

<Housing of Electrode Group>

A container made of a laminated film having a three-layer structure of nylon layer/aluminum layer/polyethylene layer and having a thickness of 0.1 mm was prepared. The electrode group produced as described above was housed in the container. Then, the inside of the container was dried in vacuum at 80° C. for 16 hours with the periphery of the container partially opened.

<Preparation of Liquid Nonaqueous Electrolyte>

$LiPF_6$ as an electrolyte was dissolved in a mixed solvent of propylene carbonate (PC) and diethyl carbonate (DEC) (volume ratio being 1:2) at a concentration of 1 mol/L. Further, as a sulfur-containing compound, 1,3-propane sultone (PS) was dissolved in the solution so that the concentration thereof in the nonaqueous electrolyte would be 0.5% by weight. A liquid nonaqueous electrolyte (nonaqueous electrolytic solution) was thus obtained. The preparation of the nonaqueous electrolyte was performed in an argon box. The composition of the liquid nonaqueous electrolyte at this stage is the final composition after production of a secondary battery.

<Production of Battery>

The nonaqueous electrolytic solution was poured into the container that houses the electrode group. Then, the opened portion of the periphery of the container was heat-sealed to seal up the container. A battery having external dimensions of 11 cm×8 cm×0.3 cm excluding the positive and negative electrode terminals (also referred to as "positive and negative electrode tabs") and having internal dimensions (dimensions of the sealed portion) of 9 cm×7 cm×0.25 cm was thus obtained. The battery thus obtained is referred to as a "first-sealed battery".

<Initial Charge>

The first-sealed battery was subjected to initial charging in an environment of 25° C. through the following procedure. First, the first-sealed battery was charged at a constant current (CC) of 0.2 C until the voltage reached 3 V. The first-sealed battery was then charged at a constant voltage (CV) of 3 V. The constant-voltage charge was terminated when the total time of the constant-current charge and the constant-voltage charge reached 10 hours.

<Initial Discharge>

Next, the first-sealed battery was discharged at a constant current (CC) of 0.2 C in an environment of 25° C. until the voltage reached 1.5 V.

<Post-Treatment>

Next, the first-sealed battery was charged at a constant current (CC) of 0.2 C in an environment of 25° C. until the voltage reached 3 V. The first-sealed battery was then charged at a constant voltage (CV) of 3 V until the current value became $\frac{1}{20}$ C. Namely, the first-sealed battery was subjected to constant-current and constant-voltage (CCCV) charge. As a result, the SOC of the first-sealed battery was 100%. The first-sealed battery was put in a temperature-controlled bath at 80° C. and retained therein for 24 hours, in order to perform the aging. Thereafter, the first-sealed battery was put in an argon box, and a single site of the sealed portion of the container member was cut by the method described with reference to FIG. 5 to release the gas in the container member. The liquid nonaqueous electrolyte was added at the same concentration as that prior to the initial charging-discharging, and the edge opened by cutting was heat-sealed. A secondary battery of Example 1 was thus produced. Table 5 shows the composition of the liquid nonaqueous electrolyte added in the post-treatment.

Examples 2, 3, 6 to 20, 22 to 24, 26, and 27

A secondary battery was produced in the same manner as described in Example 1, except that the composition of the positive electrode active material, the composition of the negative electrode active material, the composition of the nonaqueous electrolyte, E/A, E/D, the mass A of the sulfur atoms per unit volume (g/m³) of the sulfur-containing layer of the positive electrode, the mass D of the sulfur atoms per unit volume (g/m³) of the sulfur-containing layer of the negative electrode, the concentration E (mol/L) of the sulfur-containing compound in the nonaqueous electrolyte, and the composition of the nonaqueous electrolyte added in the post-treatment were set as shown in Tables 1 to 6 below. The positive electrode active material $LiMn_2O_4$ used in the examples has a spinel crystal structure. On the other hand, $LiFePO_4$ has an olivine crystal structure.

Example 4

A secondary battery was produced in the same manner as described in Example 1, except that the composition of the positive electrode active material, the composition of the negative electrode active material, the composition of the nonaqueous electrolyte, E/A, E/D, the mass A of the sulfur atoms per unit volume (g/m³) of the sulfur-containing layer of the positive electrode, the mass D of the sulfur atoms per unit volume (g/m³) of the sulfur-containing layer of the negative electrode, the concentration E (mol/L) of the sulfur-containing compound in the nonaqueous electrolyte, and the composition of the nonaqueous electrolyte added in the post-treatment were set as shown in Tables 1, 3, and 5 below and the aging conditions were changed.

The aging conditions of Example 4 are as follows. The first-sealed battery was charged at a constant voltage (CV) of 3.3 V until the current value became $\frac{1}{20}$ C. The first-sealed battery was put in a temperature-controlled bath at 80° C. and retained therein for 24 hours, in order to perform the aging d.

Example 5

A secondary battery was produced in the same manner as described in Example 1, except that the composition of the positive electrode active material, the composition of the negative electrode active material, the composition of the nonaqueous electrolyte, E/A, E/D, the mass A of the sulfur atoms per unit volume (g/m³) of the sulfur-containing layer of the positive electrode, the mass D of the sulfur atoms per unit volume (g/m³) of the sulfur-containing layer of the negative electrode, the concentration E (mol/L) of the sulfur-containing compound in the nonaqueous electrolyte, and the composition of the nonaqueous electrolyte added in the post-treatment were set as shown in Tables 1, 3, and 5 below and the aging was not performed.

Example 21

A secondary battery was produced in the same manner as described in Example 1, except that the composition of the positive electrode active material, the composition of the negative electrode active material, the composition of the nonaqueous electrolyte, E/A, E/D, the mass A of the sulfur atoms per unit volume (g/m$^3$) of the sulfur-containing layer of the positive electrode, the mass D of the sulfur atoms per unit volume (g/m$^3$) of the sulfur-containing layer of the negative electrode, the concentration E (mol/L) of the sulfur-containing compound in the nonaqueous electrolyte, and the composition of the nonaqueous electrolyte added in the post-treatment were set as shown in Tables 2, 4, and 6 below and the charge and discharge conditions from the initial charging to the post-treatment were set as described below.

The positive electrode active material Li(Ni$_{0.5}$Mn$_{1.5}$)O$_4$ used in Example 21 is a 5 V class positive electrode active material having a spinel crystal structure.

Since the secondary battery of Example 21 used Li(Ni$_{0.5}$Mn$_{1.5}$)O$_4$ as the positive electrode active material, the charge and discharge conditions from the initial charging to the post-treatment were set as described below.
<Initial Charge>
The first-sealed battery was subjected to initial charging in an environment of 25° C. through the following procedure. First, the first-sealed battery was charged at a constant current (CC) of 0.2 C until the voltage reached 3.7 V. The first-sealed battery was then charged at a constant voltage (CV) of 3.7 V. The constant-voltage charge was terminated when the total time of the constant-current charge and the constant-voltage charge reached 10 hours.
<Initial Discharge>
Next, the first-sealed battery was discharged at a constant current (CC) of 0.2 C in an environment of 25° C. until the voltage reached 2.5 V.
<Post-Treatment>
Next, the first-sealed battery was charged at a constant current (CC) of 0.2 C in an environment of 25° C. until the voltage reached 3.7 V. The first-sealed battery was then charged at a constant voltage (CV) of 3.7 V until the current value became 1/20 C. Namely, the first-sealed battery was subjected to constant-current and constant-voltage (CCCV) charge. As a result, the SOC of the first-sealed battery was 100%. The first-sealed battery was put in a temperature-controlled bath at 80° C. and retained therein for 24 hours, in order to perform the aging. The subsequent steps were performed in the same manner as described in Example 1, whereby a secondary battery of Example 21 was produced.

Example 25

A secondary battery was produced in the same manner as described in Example 1, except that the composition of the positive electrode active material, the composition of the negative electrode active material, the composition of the nonaqueous electrolyte, E/A, E/D, the mass A of the sulfur atoms per unit volume (g/m$^3$) of the sulfur-containing layer of the positive electrode, the mass D of the sulfur atoms per unit volume (g/m$^3$) of the sulfur-containing layer of the negative electrode, the concentration E (mol/L) of the sulfur-containing compound in the nonaqueous electrolyte, and the composition of the nonaqueous electrolyte added in the post-treatment were set as shown in Tables 2, 4, and 6 below and the charge and discharge conditions from the initial charging to the post-treatment were set as described below.

The negative electrode of Example 25 containing graphite was produced by the following method. A graphite powder and polyvinylidene fluoride (PVdF) were mixed at a weight ratio of 90:10, and the resultant mixture was kneaded in the presence of an organic solvent (N-methylpyrrolidone) to prepare a slurry. The obtained slurry was applied to a copper foil having a thickness of 15 μm, dried, and pressed, thereby obtaining a negative electrode. In addition, when the negative electrode containing graphite is used, the steps from the initial charging to the post-treatment were performed as described below to produce a secondary battery.
<Initial Charge>
The first-sealed battery was subjected to initial charging in an environment of 25° C. through the following procedure. First, the first-sealed battery was charged at a constant current (CC) of 0.2 C until the voltage reached 4.15 V. The first-sealed battery was then charged at a constant voltage (CV) of 4.15 V. The constant-voltage charge was terminated when the total time of the constant-current charge and the constant-voltage charge reached 10 hours.
<Initial Discharge>
Next, the first-sealed battery was discharged at a constant current (CC) of 0.2 C in an environment of 25° C. until the voltage reached 2 V.
<Post-Treatment>
Next, the first-sealed battery was charged at a constant current (CC) of 0.2 C in an environment of 25° C. until the voltage reached 4.15 V. The first-sealed battery was then charged at a constant voltage (CV) of 4.15 V until the current value became 1/20 C. Namely, the first-sealed battery was subjected to constant-current and constant-voltage (CCCV) charge. As a result, the SOC of the first-sealed battery was 100%. The first-sealed battery was put in a temperature-controlled bath at 80° C. and retained therein for 24 hours, in order to perform the aging. Thereafter, the first-sealed battery was put in an argon box, and a single site of the sealed portion of the container member was cut by the method described with reference to FIG. 5 to release the gas in the container member. The liquid nonaqueous electrolyte was added at the same concentration as that prior to the initial charging-discharging, and the edge opened by cutting was heat-sealed. A secondary battery of Example 25 was thus produced.

Comparative Example 1

A secondary battery was produced in the same manner as described in Example 1, except that the composition of the positive electrode active material, the composition of the negative electrode active material, the composition of the nonaqueous electrolyte, E/A, E/D, the mass A of the sulfur atoms per unit volume (g/m$^3$) of the sulfur-containing layer of the positive electrode, the mass D of the sulfur atoms per unit volume (g/m$^3$) of the sulfur-containing layer of the negative electrode, and the concentration E (mol/L) of the sulfur-containing compound in the nonaqueous electrolyte were set as shown in Tables 2 and 4 below and the edge opened by cutting was heat-sealed without adding a liquid nonaqueous electrolyte after the gas release in the post-treatment.

Comparative Examples 2 to 3

A secondary battery was produced in the same manner as described in Example 1, except that the composition of the positive electrode active material, the composition of the negative electrode active material, the composition of the nonaqueous electrolyte, E/A, E/D, the mass A of the sulfur atoms per unit volume $(g/m^3)$ of the sulfur-containing layer of the positive electrode, the mass D of the sulfur atoms per unit volume $(g/m^3)$ of the sulfur-containing layer of the negative electrode, the concentration E (mol/L) of the sulfur-containing compound in the nonaqueous electrolyte, and the composition of the nonaqueous electrolyte added in the post-treatment were set as shown in Tables 2, 4, and 6 below.

<Storage Test>

A storage test was performed on each secondary battery as described below.

The batteries, excluding the batteries of Examples 21 and 25, were charged at a constant current (CC) of 0.2 C until the voltage reached 3 V. The batteries were then charged at a constant voltage (CV) of 3 V until the current value became ½₀ C. Namely, the batteries were subjected to constant-current and constant-voltage (CCCV) charge to have an SOC of 100%. The charged batteries were put in a temperature-controlled bath at 55° C. The batteries were removed from the temperature-controlled bath at 55° C. every 10 days and cooled to 25° C., and then subjected to CCCV charge at 3 V and put in the temperature-controlled bath at 55° C. again. After repeating this for 90 days in total, and cooling the batteries stored in the temperature-controlled bath for 90 days to 25° C. again, the volume of the batteries was measured, and the difference between the measured volume and the volume prior to the test was determined to be the amount [ml] of gas generation. The result was 14 mL after 90 days in Example 1. The amount of gas generation becomes an indicator of life characteristics in a high temperature environment.

The battery of Example 21 was charged at a constant current (CC) of 0.2 C until the voltage reached 3.7 V. The battery was then charged at a constant voltage (CV) of 3.7 V until the current value became ½₀ C. Namely, the battery was subjected to constant-current and constant-voltage (CCCV) charge so as to have an SOC of 100°. The charged battery was put in a temperature-controlled bath at 55° C. The battery was removed from the temperature-controlled bath at 55° C. every 10 days and cooled to 25° C., and then subjected to CCCV charge at 3.7 V and put in the temperature-controlled bath at 55° C. again. After repeating this for 90 days in total, and cooling the battery stored in the temperature-controlled bath for 90 days to 25° C. again, the volume of the battery was measured, and the difference between the measured volume and the volume prior to the test was determined to be the amount [ml] of gas generation.

The battery of Example 25 was charged at a constant current (CC) of 0.2 C until the voltage reached 4.15 V. The battery was then charged at a constant voltage (CV) of 4.15 V until the current value became ½₀ C. Namely, the battery was subjected to constant-current and constant-voltage (CCCV) charge to have an SOC of 100%. The charged battery was put in a temperature-controlled bath at 55° C. The battery was removed from the temperature-controlled bath at 55° C. every 10 days and cooled to 25° C., and then subjected to CCCV charge at 4.15 V and put in the temperature-controlled bath at 55° C. again. After repeating this for 90 days in total, and cooling the battery stored in the temperature-controlled bath for 90 days to 25° C. again, the volume of the battery was measured, and the difference between the measured volume and the volume prior to the test was determined to be the amount [ml] of gas generation.

<Direct Current (DC) Resistance Measurement>

Prior to performing the storage test, DC resistance measurement was performed on the secondary batteries, excluding the batteries of Examples 21 and 25, as follows. The batteries were discharged at a constant current (CC) of 0.2 C until the voltage reached 1.5 V. Thereafter, the batteries were charged at a constant current (CC) of 0.2 C until the voltage reached 2.25 V. The batteries were then charged at a constant voltage (CV) of 2.25 V until the current value became ½₀ C to thereby have an SOC of 50%. The batteries adjusted to have an SOC of 50% were discharged at a constant current (CC) of 10 C for 10 ms, and a DC resistance [mΩ] was obtained from the difference between the voltage value and the current value at this time. The resistance increase rate was 1.5 after 90 days in Example 1.

Prior to performing the storage test, DC resistance measurement was performed on the secondary battery of Example 21, as follows. The battery was discharged at a constant current (CC) of 0.2 C until the voltage reached 2.5 V. Thereafter, the battery was charged at a constant current (CC) of 0.2 C until the voltage reached 3.1 V. The battery was then charged at a constant voltage (CV) of 3.1 V until the current value became ½₀ C so as to thereby have an SOC of 50%. The battery adjusted to have an SOC of 50% was discharged at a constant current (CC) of 10 C for 10 ms, and a DC resistance [mΩ] was obtained from the difference between the voltage value and the current value at this time.

Prior to performing the storage test, DC resistance measurement was performed on the secondary battery of Example 25, as follows. The battery was discharged at a constant current (CC) of 0.2 C until the voltage reached 2.0 V. Thereafter, the battery was charged at a constant current (CC) of 0.2 C until the voltage reached 3.8 V. The battery was then charged at a constant voltage (CV) of 3.8 V until the current value became ½₀ C to thereby have an SOC of 50%. The battery adjusted to have an SOC of 50% was discharged at a constant current (CC) of 10 C for 10 ms, and a DC resistance [mΩ] was obtained from the difference between the voltage value and the current value at this time.

Tables 1 to 6 show the composition of the positive electrode active material, the composition of the negative electrode active material, the composition of the nonaqueous electrolyte, E/A, E/D, the mass A of the sulfur atoms per unit volume $(g/m^3)$ of the sulfur-containing layer of the positive electrode, the mass D of the sulfur atoms per unit volume $(g/m^3)$ of the sulfur-containing layer of the negative electrode, the concentration E (mol/L) of the sulfur-containing compound in the nonaqueous electrolyte, the amount of gas generation [mL] after 90 days, the resistance increase rate, and the composition of the nonaqueous electrolyte added in the post-treatment, of each secondary battery. The values of E/A, E/D, A, D, and E were obtained by the above-described method. Tables 3 and 4 show the result of calculating the concentration E (mol/L) of the sulfur-containing compound of the nonaqueous electrolyte based on an amount of $6.25*10^{-3}$ L, not 6.25 mL, of the nonaqueous electrolyte, and also show E/A and E/D obtained based on the calculation result.

TABLE 1

| | Composition of positive electrode active material | Composition of negative electrode active material | Composition of nonaqueous electrolyte |
|---|---|---|---|
| Example 1 | $LiNi_{0.8}Co_{0.1}Mn_{0.1}O_2$ | $Nb_2TiO_7$ | PC:DEC = 1:2, $LiPF_6$ 1 mol/L and PS 0.5 wt % |
| Example 2 | $LiNi_{0.8}Co_{0.1}Mn_{0.1}O_2$ | $Nb_2TiO_7$ | PC:DEC = 1:2, $LiPF_6$ 1 mol/L and PS 1.5 wt % |
| Example 3 | $LiNi_{0.8}Co_{0.1}Mn_{0.1}O_2$ | $Nb_2TiO_7$ | PC:DEC = 1:2, $LiPF_6$ 1 mol/L and PS 1.5 wt % |
| Example 4 | $LiNi_{0.8}Co_{0.1}Mn_{0.1}O_2$ | $Nb_2TiO_7$ | PC:DEC = 1:2, $LiPF_6$ 1 mol/L and PS 1.5 wt % |
| Example 5 | $LiNi_{0.8}Co_{0.1}Mn_{0.1}O_2$ | $Nb_2TiO_7$ | PC:DEC = 1:2, $LiPF_6$ 1 mol/L and PS 1.5 wt % |
| Example 6 | $LiNi_{0.8}Co_{0.1}Mn_{0.1}O_2$ | $Nb_2TiO_7$ | PC:DEC = 1:2, $LiPF_6$ 1 mol/L and PS 2.5 wt % |
| Example 7 | $LiNi_{0.8}Co_{0.1}Mn_{0.1}O_2$ | $Nb_2TiO_7$ | PC:DEC = 1:2, $LiPF_6$ 1 mol/L and PS 3.5 wt % |
| Example 8 | $LiNi_{0.8}Co_{0.1}Mn_{0.1}O_2$ | $Nb_2TiO_7$ | PC:DEC = 1:2, $LiPF_6$ 1 mol/L and PS 4.5 wt % |
| Example 9 | $LiNi_{0.8}Co_{0.1}Mn_{0.1}O_2$ | $Nb_2TiO_7$ | PC:DEC = 1:2, $LiPF_6$ 1 mol/L and LiFSI 3 wt % |
| Example 10 | $LiNi_{0.8}Co_{0.1}Mn_{0.1}O_2$ | $Nb_2TiO_7$ | PC:DEC = 1:2, $LiPF_6$ 1 mol/L and LiTFSI 3 wt % |
| Example 11 | $LiNi_{0.8}Co_{0.1}Mn_{0.1}O_2$ | $Nb_2TiO_7$ | PC:DEC = 1:2, $LiPF_6$ 1 mol/L and LiFSA 2 wt % |
| Example 12 | $LiNi_{0.8}Co_{0.1}Mn_{0.1}O_2$ | $Nb_2TiO_7$ | PC:DEC = 1:2, $LiPF_6$ 1 mol/L and LiTFSA 2 wt % |
| Example 13 | $LiNi_{0.8}Co_{0.1}Mn_{0.1}O_2$ | $Nb_2TiO_7$ | PC:DEC = 1:2, $LiPF_6$ 1 mol/L and 1,3-Propene sultone 1.5 wt % |
| Example 14 | $LiNi_{0.8}Co_{0.1}Mn_{0.1}O_2$ | $Nb_2TiO_7$ | PC:DEC = 1:2, $LiPF_6$ 1 mol/L and 1,4-Butane sultone 1.5 wt % |
| Example 15 | $LiNi_{0.5}Co_{0.2}Mn_{0.3}O_2$ | $Nb_2TiO_7$ | PC:DEC = 1:2, $LiPF_6$ 1 mol/L and PS 1.5 wt % |
| Example 16 | $LiNi_{0.6}Co_{0.2}Mn_{0.2}O_2$ | $Nb_2TiO_7$ | PC:DEC = 1:2, $LiPF_6$ 1 mol/L and PS 1.5 wt % |
| Example 17 | $LiNi_{0.5}Co_{0.3}Mn_{0.2}O_2$ | $Nb_2TiO_7$ | PC:DEC = 1:2, $LiPF_6$ 1 mol/L and PS 1.5 wt % |

TABLE 2

| | Composition of positive electrode active material | Composition of negative electrode active material | Composition of nonaqueous electrolyte |
|---|---|---|---|
| Example 18 | $LiMn_2O_4$ | $Nb_2TiO_7$ | PC:DEC = 1:2, $LiPF_6$ 1 mol/L and PS 1.5 wt % |
| Example 19 | $LiFePO_4$ | $Nb_2TiO_7$ | PC:DEC = 1:2, $LiPF_6$ 1 mol/L and PS 1.5 wt % |
| Example 20 | $LiNi_{0.8}Co_{0.15}Al_{0.05}O_2$ | $Nb_2TiO_7$ | PC:DEC = 1:2, $LiPF_6$ 1 mol/L and PS 1.5 wt % |
| Example 21 | $Li(Ni_{0.5}Mn_{1.5})O_4$ (5 V Positive electrode) | $Nb_2TiO_7$ | PC:DEC = 1:2, $LiPF_6$ 1 mol/L and PS 1.5 wt % |
| Example 22 | $Li(Ni_{1/3}Mn_{1/3}Co_{1/3})O_2$ | $Nb_2TiO_7$ | PC:DEC = 1:2, $LiPF_6$ 1 mol/L and PS 1.5 wt % |
| Example 23 | $LiCoO_2$ | $Nb_2TiO_7$ | PC:DEC = 1:2, $LiPF_6$ 1 mol/L and PS 1.5 wt % |
| Example 24 | $LiNi_{0.8}Co_{0.1}Mn_{0.1}O_2$ | $Li_4Ti_5O_{12}$ | PC:DEC = 1:2, $LiPF_6$ 1 mol/L and PS 1.5 wt % |
| Example 25 | $LiNi_{0.8}Co_{0.1}Mn_{0.1}O_2$ | C(Graphite) | PC:DEC = 1:2, $LiPF_6$ 1 mol/L and PS 1.5 wt % |
| Example 26 | $LiNi_{0.8}Co_{0.1}Mn_{0.1}O_2$ | $Li_2Na_{1.8}Ti_{5.8}Nb_{0.014}$ | PC:DEC = 1:2, $LiPF_6$ 1 mol/L and PS 1.5 wt % |
| Example 27 | $LiNi_{0.8}Co_{0.1}Mn_{0.1}O_2$ | $TiO_2$ | PC:DEC = 1:2, $LiPF_6$ 1 mol/L and PS 1.5 wt % |
| Comparative Example 1 | $LiNi_{0.5}Co_{0.2}Mn_{0.3}O_2$ | $Nb_2TiO_7$ | PC:DEC = 1:2, $LiPF_6$ 1 mol/L, No additive |
| Comparative Example 2 | $LiNi_{0.5}Co_{0.2}Mn_{0.3}O_2$ | $Nb_2TiO_7$ | PC:DEC = 1:2, $LiPF_6$ 1 mol/L and Vinylene carbonate (VC) 1 wt % |
| Comparative Example 3 | $LiNi_{0.5}Co_{0.2}Mn_{0.3}O_2$ | $Nb_2TiO_7$ | PC:DEC = 1:2, $LiPF_6$ 1 mol/L and FB (Fluorobenzene) 2 wt % |

TABLE 3

| | E/A | E/D | Mass A of sulfur atoms per unit volume of sulfur-containing layer of positive electrode $(g/m^3)$ | Mass D of sulfur atoms per unit volume of sulfur-containing layer of negative electrode $(g/m^3)$ | Nonaqueous electrolyte Concentration of sulfur-containing compound E (mol/L) |
|---|---|---|---|---|---|
| Example 1 | 9.45E−05 | 4.35E−05 | 434 | 943 | 0.041 |
| Example 2 | 7.02E−05 | 4.62E−05 | 1739 | 2642 | 0.122 |
| Example 3 | 7.02E−05 | 4.62E−05 | 1739 | 2642 | 0.122 |
| Example 4 | 6.74E−05 | 4.52E−05 | 1810 | 2700 | 0.122 |
| Example 5 | 9.38E−05 | 5.08E−05 | 1300 | 2400 | 0.122 |
| Example 6 | 1.04E−04 | 6.76E−05 | 1956 | 3019 | 0.204 |
| Example 7 | 1.32E−04 | 7.98E−05 | 2173 | 3585 | 0.286 |
| Example 8 | 1.13E−04 | 7.80E−05 | 3260 | 4717 | 0.368 |
| Example 9 | 1.78E−04 | 5.33E−05 | 900 | 3000 | 0.16 |
| Example 10 | 1.14E−04 | 3.35E−05 | 910 | 3100 | 0.104 |

TABLE 4

| | E/A | E/D | Mass A of sulfur atoms per unit volume of sulfur-containing layer of positive electrode (g/m$^3$) | Mass D of sulfur atoms per unit volume of sulfur-containing layer of negative electrode (g/m$^3$) | Nonaqueous electrolyte Concentration of sulfur-containing compound E (mol/L) |
|---|---|---|---|---|---|
| Example 18 | 6.70E−05 | 4.51E−05 | 1820 | 2703 | 0.122 |
| Example 19 | 7.18E−05 | 4.52E−05 | 1700 | 2701 | 0.122 |
| Example 20 | 6.42E−05 | 4.52E−05 | 1900 | 2700 | 0.122 |
| Example 21 | 3.81E−05 | 2.60E−05 | 3200 | 4700 | 0.122 |
| Example 22 | 6.59E−05 | 4.51E−05 | 1850 | 2705 | 0.122 |
| Example 23 | 6.49E−05 | 4.51E−05 | 1880 | 2707 | 0.122 |
| Example 24 | 7.00E−05 | 4.62E−05 | 1742 | 2640 | 0.122 |
| Example 25 | 6.98E−05 | 4.60E−05 | 1748 | 2650 | 0.122 |
| Example 26 | 6.99E−05 | 4.67E−05 | 1745 | 2610 | 0.122 |
| Example 27 | 6.97E−05 | 4.66E−05 | 1750 | 2620 | 0.122 |
| Comparative Example 1 | 0 | 0 | 0 | 0 | 0 |
| Comparative Example 2 | 0 | 0 | 0 | 0 | 0 |
| Comparative Example 3 | 0 | 0 | 0 | 0 | 0 |

TABLE 5

| | After 90 days Amount of gas generation [mL] | Resistance increase rate | Composition of nonaqueous electrolyte added in post-treatment |
|---|---|---|---|
| Example 1 | 14 | 1.5 | PC:DEC = 1:2, LiPF$_6$ 1 mol/L and PS 5.0 wt % |
| Example 2 | 2.8 | 1.3 | PC:DEC = 1:2, LiPF$_6$ 1 mol/L and PS 5.0 wt % |
| Example 3 | 3.0 | 1.4 | PC:DEC = 1:2, LiPE$_6$ 1 mol/L and PS 7.0 wt % |
| Example 4 | 2.7 | 1.7 | PC:DEC = 1:2, LiPF$_6$ 1 mol/L and PS 5.0 wt % |
| Example 5 | 10.0 | 2.0 | PC:DEC = 1:2, LiPF$_6$ 1 mol/L and PS 5.0 wt % |
| Example 6 | 2.0 | 0.8 | PC:DEC = 1:2, LiPF$_6$ 1 mol/L and PS 5.0 wt % |
| Example 7 | 1.5 | 0.6 | PC:DEC = 1:2, LiPF$_6$ 1 mol/L and PS 7.0 wt % |
| Example 8 | 1.3 | 0.2 | PC:DEC = 1:2, LiPF$_6$ 1 mol/L and PS 7.0 wt % |
| Example 9 | 10.0 | 2.0 | PC:DEC = 1:2, LiPF$_6$ 1 mol/L and LiFSI 7.0 wt % |
| Example 10 | 11.0 | 3.0 | PC:DEC = 1:2, LiPF$_6$ 1 mol/L and LiTFSI 7.0 wt % |
| Example 11 | 10.0 | 4.0 | PC:DEC = 1:2, LiPF$_6$ 1 mol/L and LiFSA 5.0 wt % |
| Example 12 | 10.1 | 4.0 | PC:DEC = 1:2, LiPF$_6$ 1 mol/L and LiTFSA 5.0 wt % |
| Example 13 | 2.9 | 1.3 | PC:DEC = 1:2, LiPF$_6$ 1 mol/L and 1,3-Propene sultone 5 wt % |
| Example 14 | 3.0 | 1.3 | PC:DEC = 1:2, LiPF$_6$ 1 mol/L and 1,4-Butane sultone 5 wt % |
| Example 15 | 2.2 | 0.8 | PC:DEC = 1:2, LiPF$_6$ 1 mol/L and PS 5.0 wt % |
| Example 16 | 2.4 | 1.0 | PC:DEC = 1:2, LiPF$_6$ 1 mol/L and PS 5.0 wt % |
| Example 17 | 2.3 | 0.9 | PC:DEC = 1:2, LiPF$_6$ 1 mol/L and PS 5.0 wt % |

TABLE 6

| | After 90 days Amount of gas generation [mL] | Resistance increase rate | Composition of nonaqueous electrolyte added in post-treatment |
|---|---|---|---|
| Example 18 | 2.2 | 0.8 | PC:DEC = 1:2, LiPF$_6$ 1 mol/L and PS 5.0 wt % |
| Example 19 | 2.1 | 0.7 | PC:DEC = 1:2, LiPF$_6$ 1 mol/L and PS 5.0 wt % |
| Example 20 | 2.4 | 0.8 | PC:DEC = 1:2, LiPF$_6$ 1 mol/L and PS 5.0 wt % |
| Example 21 | 13.0 | 2.5 | PC:DEC = 1:2, LiPF$_6$ 1 mol/L and PS 5.0 wt % |
| Example 22 | 3.1 | 1.1 | PC:DEC = 1:2, LiPF$_6$ 1 mol/L and PS 5.0 wt % |
| Example 23 | 3.3 | 1.2 | PC:DEC = 1:2, LiPF$_6$ 1 mol/L and PS 5.0 wt % |
| Example 24 | 3.0 | 1.4 | PC:DEC = 1:2, LiPF$_6$ 1 mol/L and PS 5.0 wt % |
| Example 25 | 2.2 | 0.9 | PC:DEC = 1:2, LiPF$_6$ 1 mol/L and PS 5.0 wt % |
| Example 26 | 5.0 | 2.2 | PC:DEC = 1:2, LiPF$_6$ 1 mol/L and PS 5.0 wt % |
| Example 27 | 3.0 | 2.5 | PC:DEC = 1:2, LiPF$_6$ 1 mol/L and PS 5.0 wt % |
| Comparative Example 1 | 22.0 | 5.0 | None |

TABLE 6-continued

| | After 90 days Amount of gas generation [mL] | Resistance increase rate | Composition of nonaqueous electrolyte added in post-treatment |
|---|---|---|---|
| Comparative Example 2 | 20.0 | 3.5 | PC:DEC = 1:2, LiPF$_6$ 1 mol/L and Vinylene carbonate (VC) 3 wt % |
| Comparative Example 3 | 20.2 | 3.6 | PC:DEC = 1:2, LiPF$_6$ 1 mol/L and FB (Fluorobenzene) 3 wt % |

As is apparent from Tables 1 to 6, the amounts of gas generation after storage for 90 days were smaller and the resistance increase rates were lower in Examples 1 to 27 than those of Comparative Examples 1 to 3. Comparative Examples 1 to 3 are examples of not including any of a sulfur-containing imide compound and a sultone compound in the nonaqueous electrolyte.

Comparing Examples 1 to 14, in which the positive electrode active material and the negative electrode active material have the same composition, reveals that Examples 1 to 8, 13, and 14, which include a sultone compound in the nonaqueous electrolyte, tend to have excellent effects of suppressing gas generation and a resistance increase, as compared to Examples 9 to 12, which include a sulfur-containing imide compound in the nonaqueous electrolyte.

Also, as shown in Examples 15 to 27, even when the positive electrode active material or the negative electrode active material is changed to that different from Example 1, for example, even when the positive electrode active material is changed to a lithium manganese composite oxide having a spinel structure, a lithium phosphorus oxide having an olivine structure, a lithium cobalt composite oxide, and the like, or the negative electrode active material is changed to a lithium titanate having a spinel structure, a carbon material, an orthorhombic titanium composite oxide, monoclinic titanium dioxide, and the like, the effects of suppressing gas generation and a resistance increase are obtained.

Since the secondary battery of at least one embodiment or example described above satisfies expression (1): $(1 \times 10^{-6} \leq E/A \leq 9 \times 10^{-4})$, it can suppress the amount of gas generation and the resistance increase that occur under high temperature and can achieve excellent life performance even at high temperature.

Example 28

<Production of Electrode Group>

An electrode group was prepared by the same method as described in Example 1.

<Housing of Electrode Group>

Housing of the electrode group was performed by the same method as described in Example 1.

<Preparation of Liquid Nonaqueous Electrolyte>

LiPF$_6$ as an electrolyte was dissolved in a mixed solvent of propylene carbonate (PC) and diethyl carbonate (DEC) (volume ratio being 1:2) at a concentration of 1 mol/L. As a sulfur-containing compound, 1,3-propane sultone (PS) was prepared. Ethyl propanesulfonate was also prepared. They were dissolved so that the concentration of each of them in the nonaqueous electrolyte would be 1.5% by weight. A liquid nonaqueous electrolyte (nonaqueous electrolytic solution) was thus obtained. The preparation of the nonaqueous electrolyte was performed in an argon box.

<Production of Battery>

The battery was produced by the same method as described in Example 1.

<Initial Charge>

Initial charging was performed by the same method as described in Example 1.

<Initial Discharge>

Initial discharging was performed by the same method as described in Example 1.

<Post-Treatment>

Next, the first-sealed battery was charged at a constant current (CC) of 0.2 C in an environment of 25° C. until the voltage reached 3 V. The first-sealed battery was then charged at a constant voltage (CV) of 3 V until the current value became 1/20 C. Namely, the first-sealed battery was subjected to constant-current and constant-voltage (CCCV) charge. As a result, the SOC of the first-sealed battery was 100%. The first-sealed battery was put in a temperature-controlled bath at 80° C. and retained therein for 24 hours, in order to perform the aging. Thereafter, the first-sealed battery was put in an argon box, and a single site of the sealed portion of the container member was cut by the method described with reference to FIG. 5 to release the gas in the container member. The second sealing was then performed by heat-sealing the edge opened by the cutting. A secondary battery of Example 28 was thus produced.

Example 29

A secondary battery was produced in the same manner as described in Example 28, except that a liquid nonaqueous electrolyte described below was used. LiPF$_6$ as an electrolyte was dissolved in a mixed solvent of propylene carbonate (PC) and methyl ethyl carbonate (MEC) (volume ratio being 1:2) at a concentration of 1 mol/L. As a sulfur-containing compound, 1,3-propane sultone (PS) and methyl propanesulfonate were prepared. They were dissolved so that the concentration of each of them in the nonaqueous electrolyte would be 1.5% by weight. A liquid nonaqueous electrolyte (nonaqueous electrolytic solution) was thus obtained.

Example 30

A secondary battery was produced in the same manner as described in Example 28, except that a liquid nonaqueous electrolyte described below was used. LiPF$_6$ as an electrolyte was dissolved in a mixed solvent of propylene carbonate (PC) and diethyl carbonate (DEC) (volume ratio being 1:2) at a concentration of 1 mol/L. As a sulfur-containing compound, 1,3-propane sultone (PS) and propyl propanesulfonate were prepared. They were dissolved so that the concentration of each of them in the nonaqueous electrolyte would be 1.5% by weight. A liquid nonaqueous electrolyte (nonaqueous electrolytic solution) was thus obtained.

Examples 31 to 33

A secondary battery was produced in the same manner as described in Example 1, except for the following. The composition of the liquid nonaqueous electrolyte injected at the first time was changed as shown in Table 9. The aging conditions in the post-treatment were changed to aging performed at a temperature of 120° C. for 24 hours. The composition of the liquid nonaqueous electrolyte added in the post-treatment was changed as shown in Table 11.

Example 34

A secondary battery was produced in the same manner as described in Example 28, except that the same type of positive electrode active material as that used in Example 15 was used.

Example 35

A secondary battery was produced in the same manner as described in Example 28, except for the following. The same type of positive electrode active material as that used in Example 16 was used. The composition of the liquid non-aqueous electrolyte was changed as shown in Table 10.

Example 36

A secondary battery was produced in the same manner as described in Example 28, except that the same type of positive electrode active material as that used in Example 18 was used.

Example 37

A secondary battery was produced in the same manner as described in Example 28, except that the same type of positive electrode active material as that used in Example 19 was used.

Example 38

A secondary battery was produced in the same manner as described in Example 28, except that the same type of positive electrode active material as that used in Example 20 was used.

Example 39

<Production of Electrode Group>
An electrode group was prepared by the same method as described in Example 21.
<Housing of Electrode Group>
Housing of the electrode group was performed by the same method as described in Example 21.
<Preparation of Liquid Nonaqueous Electrolyte>
$LiPF_6$ as an electrolyte was dissolved in a mixed solvent of propylene carbonate (PC) and diethyl carbonate (DEC) (volume ratio being 1:2) at a concentration of 1 mol/L. As a sulfur-containing compound, 1,3-propane sultone (PS) and ethyl propanesulfonate were prepared. They were dissolved so that the concentration of each of them in the nonaqueous electrolyte would be 1.5% by weight. A liquid nonaqueous electrolyte (nonaqueous electrolytic solution) was thus obtained. The preparation of the nonaqueous electrolyte was performed in an argon box.
<Production of Battery>
The battery was produced by the same method as described in Example 21.

<Initial Charge>
Initial charging was performed by the same method as described in Example 21.
<Initial Discharge>
Initial discharging was performed by the same method as described in Example 21.
<Post-Treatment>
Next, the first-sealed battery was charged at a constant current (CC) of 0.2 C in an environment of 25° C. until the voltage reached 3.7 V. The first-sealed battery was then charged at a constant voltage (CV) of 3.7 V until the current value became ½0 C. Namely, the first-sealed battery was subjected to constant-current and constant-voltage (CCCV) charge. As a result, the SOC of the first-sealed battery was 100%. The first-sealed battery was put in a temperature-controlled bath at 80° C. and retained therein for 24 hours, in order to perform the aging. Thereafter, the first-sealed battery was put in an argon box, and a single site of the sealed portion of the container member was cut by the method described with reference to FIG. 5 to release the gas in the container member. The second sealing was then performed by heat-sealing the edge opened by the cutting. A secondary battery of Example 39 was thus produced.

Example 40

A secondary battery was produced in the same manner as described in Example 28, except that the same type of positive electrode active material as that used in Example 22 was used.

Example 41

A secondary battery was produced in the same manner as described in Example 28, except that the same type of positive electrode active material as that used in Example 23 was used.

Example 42

A secondary battery was produced in the same manner as described in Example 28, except that the same type of negative electrode active material as that used in Example 24 was used.

Example 43

<Production of Electrode Group>
An electrode group was prepared by the same method as described in Example 25.
<Housing of Electrode Group>
Housing of the electrode group was performed by the same method as described in Example 25.
<Preparation of Liquid Nonaqueous Electrolyte>
$LiPF_6$ as an electrolyte was dissolved in a mixed solvent of propylene carbonate (PC) and diethyl carbonate (DEC) (volume ratio being 1:2) at a concentration of 1 mol/L. As a sulfur-containing compound, 1,3-propane sultone (PS) and ethyl propanesulfonate were prepared. They were dissolved so that the concentration of each of them in the nonaqueous electrolyte would be 1.5% by weight. A liquid nonaqueous electrolyte (nonaqueous electrolytic solution) was thus obtained. The preparation of the nonaqueous electrolyte was performed in an argon box.
<Production of Battery>
The battery was produced by the same method as described in Example 25.

<Initial Charge>

Initial charging was performed by the same method as described in Example 25.

<Initial Discharge>

Initial discharging was performed by the same method as described in Example 25.

<Post-Treatment>

Next, the first-sealed battery was charged at a constant current (CC) of 0.2 C in an environment of 25° C. until the voltage reached 4.15 V. The first-sealed battery was then charged at a constant voltage (CV) of 4.15 V until the current value became $\frac{1}{20}$ C. Namely, the first-sealed battery was subjected to constant-current and constant-voltage (CCCV) charge. As a result, the SOC of the first-sealed battery was 100%. The first-sealed battery was put in a temperature-controlled bath at 80° C. and retained therein for 24 hours, in order to perform the aging. Thereafter, the first-sealed battery was put in an argon box, and a single site of the sealed portion of the container member was cut by the method described with reference to FIG. 5 to release the gas in the container member. The second sealing was then performed by heat-sealing the edge opened by the cutting. A secondary battery of Example 43 was thus produced.

Example 44

A secondary battery was produced in the same manner as described in Example 28, except that the same type of negative electrode active material as that used in Example 26 was used.

Example 45

A secondary battery was produced in the same manner as described in Example 28, except that the same type of negative electrode active material as that used in Example 27 was used.

Table 11 shows the following of Examples 28 to 45: E/A; E/D; the mass A of the sulfur atoms per unit volume (g/m³) of the sulfur-containing layer of the positive electrode; the mass D of the sulfur atoms per unit volume (g/m³) of the sulfur-containing layer of the negative electrode; and the concentration E (mol/L) of the sulfur-containing compound in the nonaqueous electrolyte. The concentration E (mol/L) of the sulfur-containing compound in the nonaqueous electrolyte is the result of calculation performed based on an amount of $6.25*10^{-3}$ L of the nonaqueous electrolyte.

<Storage Test and Direct Current (DC) Resistance Measurement>

Measurement was performed on the secondary battery of Example 39 under the same conditions as those described in Example 21. Measurement was performed on the secondary battery of Example 43 under the same conditions as those described in Example 25.

Measurement was performed on the secondary batteries of Examples 28 to 38, 40 to 42, 44, and 45, excluding Examples 39 and 43, under the same conditions as those for the examples other than Examples 21 and 25. The results thereof are shown in Table 12.

<Measurement of Amount of Gas Generated after 150 Days>

Tables 7, 8, and 12 show the results of the storage test conducted on Examples 1 to 45 under the same conditions as those described above, except that the period of storage in the temperature-controlled bath was extended from 90 days to 150 days.

<Measurement of Area Value B>

A GCMS measurement was performed on the nonaqueous electrolytes of the secondary batteries of Examples 28 to 45 under the above-described conditions, and a peak area value B when setting a peak area value A to 10 was obtained for each of the nonaqueous electrolytes. Table 12 shows the obtained peak area values B. FIG. 10 shows a total ion chromatogram (TIC) of the nonaqueous electrolyte of Example 28. FIG. 11 shows an enlarged view of the vicinity of a peak $P_1$ in the TIC shown in FIG. 10. FIG. 12 shows an enlarged view of the vicinity of 7 to 9 time/min in the TIC shown in FIG. 10.

The vertical axis of the TIC shown in FIG. 10 represents intensity/a.u. (peak intensity, arbitrary units), and the horizontal axis thereof represents time/min (retention time). The peak $P_1$ originates from propane sultone. The peak $P_2$ appearing near 7 to 9 time/min shown in FIG. 12 originates from ethyl propanesulfonate. On the other hand, the peak $P_3$ between 5 to 7 time/min shown in FIG. 10 originates from propylene carbonate. The peak $P_4$ in the range smaller than 5 time/min shown in FIG. 10 originates from diethyl carbonate. The results of the GCMS measurement performed on the nonaqueous electrolytes of Examples 31 to 33 confirmed the following. Example 31 contained ethyl propanesulfonate. Example 32 contained methyl propanesulfonate. Example 33 contained propyl propanesulfonate. The results of the GCMS measurement of the examples other than Examples 31 to 33 confirmed that the examples contained the types of propanesulfonic acid ester shown in Tables 9 and 10.

TABLE 7

|  | After 150 days Amount of gas generation [mL] |
| --- | --- |
| Example 1 | 22 |
| Example 2 | 6.5 |
| Example 3 | 6.0 |
| Example 4 | 6.3 |
| Example 5 | 16.0 |
| Example 6 | 5.8 |
| Example 7 | 5.0 |
| Example 8 | 4.7 |
| Example 9 | 16.0 |
| Example 10 | 17.0 |
| Example 11 | 16.0 |
| Example 12 | 16.1 |
| Example 13 | 6.6 |
| Example 14 | 6.4 |
| Example 15 | 6.0 |
| Example 16 | 6.2 |
| Example 17 | 6.1 |

TABLE 8

|  | After 150 days Amount of gas generation [mL] |
| --- | --- |
| Example 18 | 6.0 |
| Example 19 | 6.1 |
| Example 20 | 6.2 |
| Example 21 | 21.0 |
| Example 22 | 6.1 |
| Example 23 | 6.4 |
| Example 24 | 6.0 |
| Example 25 | 6.0 |
| Example 26 | 8.0 |
| Example 27 | 6.0 |
| Comparative Example 1 | 32.0 |

TABLE 8-continued

|  | After 150 days Amount of gas generation [mL] |  |
|---|---|---|
| Comparative Example 2 | 30.0 | 5 |
| Comparative Example 3 | 31 |  |

TABLE 9

|  | Composition of positive electrode active material | Composition of negative electrode active material | Composition of nonaqueous electrolyte (At time of injection) | Aging conditions |
|---|---|---|---|---|
| Example 28 | $LiNi_{0.8}Co_{0.1}Mn_{0.1}O_2$ | $Nb_2TiO_7$ | PC:DEC = 1:2, $LiPF_6$ 1 mol/L and PS 1.5 wt %, Ethyl propanesulfonate 1.5 wt % | 80° C., 24 hours |
| Example 29 | $LiNi_{0.8}Co_{0.1}Mn_{0.1}O_2$ | $Nb_2TiO_7$ | PC:MEC = 1:2, $LiPF_6$ 1 mol/L and PS 1.5 wt %, Methyl propanesulfonate 1.5 wt % | 80° C., 24 hours |
| Example 30 | $LiNi_{0.8}Co_{0.1}Mn_{0.1}O_2$ | $Nb_2TiO_7$ | PC:DEC = 1:2, $LiPF_6$ 1 mol/L and PS 1.5 wt %, Propyl propanesulfonate 1.5 wt % | 80° C., 24 hours |
| Example 31 | $LiNi_{0.8}Co_{0.1}Mn_{0.1}O_2$ | $Nb_2TiO_7$ | PC:DEC = 1:2, $LiPF_6$ 1 mol/L and PS 1.5 wt % | 120° C., 24 hours |
| Example 32 | $LiNi_{0.8}Co_{0.1}Mn_{0.1}O_2$ | $Nb_2TiO_7$ | PC:MEC = 1:2, $LiPF_6$ 1 mol/L and PS 1.5 wt % | 120° C., 24 hours |
| Example 33 | $LiNi_{0.8}Co_{0.1}Mn_{0.1}O_2$ | $Nb_2TiO_7$ | PC:PMC = 1:2, $LiPF_6$ 1 mol/L and PS 1.5 wt % | 120° C., 24 hours |

TABLE 10

|  | Composition of positive electrode active material | Composition of negative electrode active material | Composition of nonaqueous electrolyte (At time of injection) | Aging conditions |
|---|---|---|---|---|
| Example 34 | $LiNi_{0.5}Co_{0.2}Mn_{0.3}O_2$ | $Nb_2TiO_7$ | Same composition as composition of Example 28 | 80° C., 24 hours |
| Example 35 | $LiNi_{0.6}Co_{0.2}Mn_{0.2}O_2$ | $Nb_2TiO_7$ | PC:MEC = 1:2, $LiPF_6$ 1 mol/L and PS 1.5 wt %, Ethyl propanesulfonate 1.5 wt % | 80° C., 24 hours |
| Example 36 | $LiMn_2O_4$ | $Nb_2TiO_7$ | Same composition as composition of Example 28 | 80° C., 24 hours |
| Example 37 | $LiFePO_4$ | $Nb_2TiO_7$ | Same composition as composition of Example 28 | 80° C., 24 hours |
| Example 38 | $LiNi_{0.8}Co_{0.15}Al_{0.05}O_2$ | $Nb_2TiO_7$ | Same composition as composition of Example 28 | 80° C., 24 hours |
| Example 39 | $Li(Ni_{0.5}Mn_{1.5})O_4$ (5 V Positive electrode) | $Nb_2TiO_7$ | Same composition as composition of Example 28 | 80° C., 24 hours |
| Example 40 | $Li(Ni_{1/3}Mn_{1/3}Co_{1/3})O_2$ | $Nb_2TiO_7$ | Same composition as composition of Example 28 | 80° C., 24 hours |
| Example 41 | $LiCoO_2$ | $Nb_2TiO_7$ | Same composition as composition of Example 28 | 80° C., 24 hours |
| Example 42 | $LiNi_{0.8}Co_{0.1}Mn_{0.1}O_2$ | $Li_4Ti_5O_{12}$ | Same composition as composition of Example 28 | 80° C., 24 hours |
| Example 43 | $LiNi_{0.8}Co_{0.1}Mn_{0.1}O_2$ | C (Graphite) | Same composition as composition of Example 28 | 80° C., 24 hours |
| Example 44 | $LiNi_{0.8}Co_{0.1}Mn_{0.1}O_2$ | $Li_2Na_{1.8}Ti_{5.8}Nb_{0.014}$ | Same composition as composition of Example 28 | 80° C., 24 hours |
| Example 45 | $LiNi_{0.8}Co_{0.1}Mn_{0.1}O_2$ | $TiO_2$ | Same composition as composition of Example 28 | 80° C., 24 hours |

TABLE 11

| | E/A | E/D | Mass A of sulfur atoms per unit volume of sulfur-containing layer of positive electrode (g/m³) | Mass D of sulfur atoms per unit volume of sulfur-containing layer of negative electrode (g/m³) | Nonaqueous electrolyte Concentration of sulfur-containing compound E (mol/L) |
|---|---|---|---|---|---|
| Example 28 | 3.69392E−04 | 2.01486E−04 | 600 | 1100 | 0.222 |
| Example 29 | 3.62305E−04 | 2.02331E−04 | 621 | 1112 | 0.225 |
| Example 30 | 3.41527E−04 | 1.8913E−04 | 623 | 1125 | 0.213 |
| Example 31 | 1.10818E−04 | 7.38783E−05 | 2000 | 3000 | 0.222 |
| Example 32 | 1.12215E−04 | 7.49722E−05 | 2005 | 3001 | 0.225 |
| Example 33 | 1.05962E−04 | 7.08765E−05 | 2008 | 3002 | 0.213 |
| Example 34 | 2.21635E−04 | 1.1665E−04 | 1000 | 1900 | 0.222 |
| Example 35 | 2.21193E−04 | 1.11937E−04 | 1002 | 1980 | 0.222 |
| Example 36 | 2.241E−04 | 1.1665E−04 | 989 | 1900 | 0.222 |
| Example 37 | 2.21414E−04 | 1.12505E−04 | 1001 | 1970 | 0.222 |
| Example 38 | 2.21635E−04 | 1.17891E−04 | 1000 | 1880 | 0.222 |
| Example 39 | 2.19441E−04 | 1.1665E−04 | 1010 | 1900 | 0.222 |
| Example 40 | 1.23131E−04 | 7.38783E−05 | 1800 | 3000 | 0.222 |
| Example 41 | 2.43823E−04 | 1.10818E−04 | 909 | 2000 | 0.222 |
| Example 42 | 2.21857E−04 | 1.0972E−04 | 999 | 2020 | 0.222 |
| Example 43 | 2.26158E−04 | 1.17891E−04 | 980 | 1880 | 0.222 |
| Example 44 | 2.241E−04 | 1.23818E−04 | 989 | 1790 | 0.222 |
| Example 45 | 2.26389E−04 | 1.17891E−04 | 979 | 1880 | 0.222 |

TABLE 12

| | After 90 days Amount of gas generation [mL] | After 150 days Amount of gas generation [mL] | Resistance increase rate | Composition of nonaqueous electrolyte added in post-treatment | Area value B |
|---|---|---|---|---|---|
| Example 28 | 0.2 | 2.2 | 1.1 | No addition | 12 |
| Example 29 | 0.3 | 2.5 | 1.2 | No addition | 14 |
| Example 30 | 0.2 | 2.4 | 1.3 | No addition | 13 |
| Example 31 | 0.2 | 2.2 | 1.1 | PC:DEC = 1:2, LiPF₆ 1 mol/L and PS 7.0 wt % | 14 |
| Example 32 | 0.3 | 2.5 | 1.2 | PC:MEC = 1:2, LiPF₆ 1 mol/L and PS 7.0 wt % | 13 |
| Example 33 | 0.2 | 2.4 | 1.3 | PC:PMC = 1:2, LiPF₆ 1 mol/L and PS 7.0 wt % | 15 |
| Example 34 | 0.2 | 2.2 | 0.5 | No addition | 14 |
| Example 35 | 0.2 | 2.5 | 0.8 | No addition | 12 |
| Example 36 | 0.3 | 2.4 | 0.6 | No addition | 13 |
| Example 37 | 0.2 | 2.2 | 0.5 | No addition | 11 |
| Example 38 | 0.1 | 2.1 | 0.4 | No addition | 14 |
| Example 39 | 2.2 | 6.0 | 0.5 | No addition | 15 |
| Example 40 | 0.1 | 2.2 | 2.0 | No addition | 11 |
| Example 41 | 0.4 | 2.5 | 0.9 | No addition | 12 |
| Example 42 | 0.5 | 2.1 | 1.0 | No addition | 13 |
| Example 43 | 0.4 | 2.5 | 0.7 | No addition | 14 |
| Example 44 | 0.8 | 3.5 | 1.7 | No addition | 12 |
| Example 45 | 0.2 | 2.8 | 1.8 | No addition | 16 |

The results shown in Tables 7 to 12 reveal the following. In regard to the secondary batteries of Examples 28 to 45, the amount of gas generated after 90-day storage and the amount of gas generated after 150-day storage were small, and the resistance increase rate was low. Comparing the amount of gas generated after 150-day storage of Examples 28 to 45 and the amount of gas generated after 150-day storage of Examples 1 to 27 reveals that the former was smaller. This is because Examples 28 to 45 included a propanesulfonic acid ester in the nonaqueous electrolyte.

Also, as shown in Examples 34 to 45, even when the positive electrode active material or the negative electrode active material is changed to that different from Example 28, for example even when the positive electrode active material is changed to a lithium manganese composite oxide having a spinel structure, a lithium phosphorus oxide having an olivine structure, a lithium cobalt composite oxide, and the like, or the negative electrode active material is changed to a lithium titanate having a spinel structure, a carbon material, an orthorhombic titanium composite oxide, monoclinic titanium dioxide, and the like, the effects of suppressing gas generation and a resistance increase are obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A lithium ion secondary battery, comprising:
a positive electrode;
a negative electrode; and
a nonaqueous electrolyte,
wherein
the positive electrode includes a positive electrode active material-containing layer and a sulfur-containing layer provided on at least a part of the positive electrode active material-containing layer and further comprising oxygen atoms and carbon atoms,
the nonaqueous electrolyte includes a sulfur-containing compound comprising a sultone compound and a propanesulfonic acid ester,
the lithium ion secondary battery satisfies expression (1):

$$1 \times 10^{-6} \leq E/A \leq 9 \times 10^{-4} \tag{1}$$

where A denotes a mass of sulfur atoms per unit volume (g/m³) of the sulfur-containing layer of the positive electrode, and E denotes a concentration (mol/L) of the sulfur-containing compound in the nonaqueous electrolyte,
wherein the positive electrode active material-containing layer contains as a positive electrode active material at least one compound allowing Li or Li ions to be inserted thereinto and extracted therefrom selected from the group consisting of manganese dioxide, iron oxides, copper oxides, nickel oxides, lithium manganese composite oxides, lithium nickel composite oxides, lithium cobalt composite oxides, lithium nickel cobalt composite oxides, lithium manganese cobalt composite oxides, lithium manganese nickel composite oxides having a spinel structure, lithium phosphorus oxides having an olivine structure, ferrous sulfates, vanadium oxides, $LiNi_xCo_yM_zO_2$ where x+y+z=1, x≥0.8, and M consists of Mn and Al, and lithium nickel cobalt manganese composite oxides,
the negative electrode comprises a negative electrode active material-containing layer and a sulfur-containing layer provided on at least a part of the negative electrode active material-containing layer, and
the lithium ion secondary battery satisfies expression (2):

$$2 \times 10^{-6} \leq E/D \leq 3 \times 10^{-4} \tag{2}$$

where D denotes a mass of sulfur atoms per unit volume (g/m³) of the sulfur-containing layer of the negative electrode, and E denotes a concentration (mol/L) of the sulfur-containing compound in the nonaqueous electrolyte,
wherein the A is in a range of greater than 0 to 3500 g/m³, the E is in a range of greater than 0 to 4.5×10⁻¹ mol/L, and the D is in a range of greater than 0 to 6600 g/m³,
wherein the negative electrode active material-containing layer includes at least one selected from the group consisting of a niobium titanium composite oxide represented by a general formula of $Li_xTi_{1-y}M1_yNb_{2-z}M2_zO_{7+\delta}$ and a niobium titanium composite oxide represented by a general formula of $Li_xTi_{1-y}M3_{y+z}Nb_{2-z}O_{7-\delta}$,
where the M1 is at least one selected from the group consisting of Zr, Si, and Sn, the M2 is at least one selected from the group consisting of V, Ta, and Bi, the M3 is at least one selected from the group consisting of Mg, Fe, Ni, Co, W, Ta, and Mo, the x satisfies 0≤x≤5, the y satisfies 0≤y<1, the z satisfies 0≤z<2, and the δ satisfies −0.3≤δ≤0.3, and
wherein in a total ion chromatogram of the nonaqueous electrolyte according to gas chromatograph-mass spectrometry, a peak area value B of the propanesulfonic acid ester is 0.2 to 20 when a peak area value A of the sultone compound is set to 10.

2. The lithium ion secondary battery according to claim 1, wherein the propanesulfonic acid ester is at least one selected from the group consisting of methyl propanesulfonate, ethyl propanesulfonate, and propyl propanesulfonate.

3. A battery pack comprising one or two or more of the lithium ion secondary battery according to claim 1.

4. The battery pack according to claim 3, further comprising:
an external power distribution terminal; and
a protective circuit.

5. The battery pack according to claim 3, comprising two or more of the lithium ion secondary battery, wherein the two or more lithium ion secondary batteries are electrically connected in series, in parallel, or in a combination of in-series connection and in-parallel connection.

6. A vehicle comprising the battery pack according to claim 5.

7. The vehicle according to claim 6, comprising a mechanism configured to convert kinetic energy of the vehicle into regenerative energy.

* * * * *